US008958440B2

(12) United States Patent
Elzur

(10) Patent No.: US 8,958,440 B2
(45) Date of Patent: *Feb. 17, 2015

(54) SYSTEM AND METHOD FOR IDENTIFYING UPPER LAYER PROTOCOL MESSAGE BOUNDARIES

(71) Applicant: Broadcom Corporation, Irvine, CA (US)

(72) Inventor: Uri Elzur, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/903,454

(22) Filed: May 28, 2013

(65) Prior Publication Data

US 2013/0262607 A1 Oct. 3, 2013

Related U.S. Application Data

(63) Continuation of application No. 12/758,484, filed on Apr. 12, 2010, now Pat. No. 8,451,863, which is a continuation of application No. 11/868,655, filed on Oct. 8, 2007, now Pat. No. 8,135,016, which is a (Continued)

(51) Int. Cl.
*H04J 3/16* (2006.01)
*H04L 29/06* (2006.01)

(52) U.S. Cl.
CPC .......... *H04L 29/06217* (2013.01); *H04L 69/16* (2013.01); *H04L 69/166* (2013.01); *H04L 69/22* (2013.01); *H04L 69/161* (2013.01)
USPC ............................. 370/469; 370/473; 370/474

(58) Field of Classification Search
None
See application file for complete search history.

(56) References Cited

U.S. PATENT DOCUMENTS

| 4,333,020 A | 6/1982 | Maeder |
| 4,395,774 A | 7/1983 | Rapp |
| 4,433,378 A | 2/1984 | Leger |
| 4,445,051 A | 4/1984 | Elmasry |

(Continued)

FOREIGN PATENT DOCUMENTS

| EP | 0465090 B1 | 4/1996 |
| EP | 0692892 B1 | 4/2003 |

(Continued)

OTHER PUBLICATIONS

Ang, "An Evaluation of an Attempt at Offloading TCP/IP Protocol Processing Onto an i90RN-Based iNIC", Hewlett Packard, 2001, pp. 1-33.

(Continued)

*Primary Examiner* — Robert Wilson
(74) *Attorney, Agent, or Firm* — Oblon, Spivak, McClelland, Maier & Neustadt, L.L.P.

(57) ABSTRACT

Systems and methods that identify the Upper Layer Protocol (ULP) message boundaries are provided. In one example, a method that identifies ULP message boundaries is provided. The method may include one or more of the following steps: attaching a framing header of a frame to a data payload to form a packet, the framing header being placed immediately after the byte stream transport protocol header, the framing header comprising a length field comprising a length of a framing protocol data unit (PDU); and inserting a marker in the packet, the marker pointing backwards to the framing header and being inserted at a preset interval.

21 Claims, 18 Drawing Sheets

Related U.S. Application Data continuation of application No. 10/230,643, filed on Aug. 29, 2002, now Pat. No. 7,295,555.

(60) Provisional application No. 60/372,851, filed on Apr. 16, 2002, provisional application No. 60/372,852, filed on Apr. 16, 2002, provisional application No. 60/363,356, filed on Mar. 11, 2002, provisional application No. 60/363,381, filed on Mar. 8, 2002.

(56) References Cited

U.S. PATENT DOCUMENTS

| | | |
|---|---|---|
| 4,449,248 A | 5/1984 | Leslie |
| 4,463,424 A | 7/1984 | Mattson |
| 4,519,068 A | 5/1985 | Krebs |
| 4,545,023 A | 10/1985 | Mizzi |
| 4,590,550 A | 5/1986 | Eilert |
| 4,599,526 A | 7/1986 | Paski |
| 4,649,293 A | 3/1987 | Ducourant |
| 4,680,787 A | 7/1987 | Marry |
| 4,717,838 A | 1/1988 | Brehmer |
| 4,721,866 A | 1/1988 | Chi |
| 4,727,309 A | 2/1988 | Vajdic |
| 4,737,975 A | 4/1988 | Shafer |
| 4,760,571 A | 7/1988 | Schwarz |
| 4,761,822 A | 8/1988 | Maile |
| 4,777,657 A | 10/1988 | Gillaspie |
| 4,791,324 A | 12/1988 | Hodapp |
| 4,794,649 A | 12/1988 | Fujiwara |
| 4,804,954 A | 2/1989 | Macnak |
| 4,806,796 A | 2/1989 | Bushey |
| 4,807,282 A | 2/1989 | Kazan |
| 4,817,054 A | 3/1989 | Banerjee |
| 4,817,115 A | 3/1989 | Campo |
| 4,821,034 A | 4/1989 | Anderson |
| 4,850,009 A | 7/1989 | Zook |
| 4,890,832 A | 1/1990 | Komaki |
| 4,894,792 A | 1/1990 | Mitchell |
| 4,916,441 A | 4/1990 | Gombrich |
| 4,964,121 A | 10/1990 | Moore |
| 4,969,206 A | 11/1990 | Desrochers |
| 4,970,406 A | 11/1990 | Fitzpatrick |
| 4,977,611 A | 12/1990 | Maru |
| 4,995,099 A | 2/1991 | Davis |
| 5,008,879 A | 4/1991 | Fischer |
| 5,025,486 A | 6/1991 | Klughart |
| 5,029,183 A | 7/1991 | Tymes |
| 5,031,231 A | 7/1991 | Miyazaki |
| 5,033,109 A | 7/1991 | Kawano |
| 5,041,740 A | 8/1991 | Smith |
| 5,055,659 A | 10/1991 | Hendrick |
| 5,055,660 A | 10/1991 | Bertagna |
| 5,079,452 A | 1/1992 | Lain |
| 5,081,402 A | 1/1992 | Koleda |
| 5,087,099 A | 2/1992 | Stolarczyk |
| 5,115,151 A | 5/1992 | Hull |
| 5,117,501 A | 5/1992 | Childress |
| 5,119,502 A | 6/1992 | Kallin |
| 5,121,408 A | 6/1992 | Cai |
| 5,122,689 A | 6/1992 | Barre |
| 5,123,029 A | 6/1992 | Bantz |
| 5,128,938 A | 7/1992 | Borras |
| 5,134,347 A | 7/1992 | Koleda |
| 5,142,573 A | 8/1992 | Umezawa |
| 5,149,992 A | 9/1992 | Allstot |
| 5,150,361 A | 9/1992 | Wieczorek |
| 5,152,006 A | 9/1992 | Klaus |
| 5,153,878 A | 10/1992 | Krebs |
| 5,162,674 A | 11/1992 | Allstot |
| 5,175,870 A | 12/1992 | Mabey |
| 5,177,378 A | 1/1993 | Nagasawa |
| 5,179,721 A | 1/1993 | Comroe |
| 5,181,200 A | 1/1993 | Harrison |
| 5,196,805 A | 3/1993 | Beckwith |
| 5,216,295 A | 6/1993 | Hoang |
| 5,230,084 A | 7/1993 | Nguyen |
| 5,239,662 A | 8/1993 | Danielson |
| 5,241,542 A | 8/1993 | Natarajan |
| 5,241,691 A | 8/1993 | Owen |
| 5,247,656 A | 9/1993 | Kabuo |
| 5,249,220 A | 9/1993 | Moskowitz |
| 5,249,302 A | 9/1993 | Metroka |
| 5,265,238 A | 11/1993 | Canova |
| 5,265,270 A | 11/1993 | Stengel |
| 5,274,666 A | 12/1993 | Dowdell |
| 5,276,680 A | 1/1994 | Messenger |
| 5,278,831 A | 1/1994 | Mabey |
| 5,289,055 A | 2/1994 | Razavi |
| 5,289,469 A | 2/1994 | Tanaka |
| 5,291,516 A | 3/1994 | Dixon |
| 5,293,639 A | 3/1994 | Wilson |
| 5,296,849 A | 3/1994 | Ide |
| 5,297,144 A | 3/1994 | Gilbert |
| 5,301,196 A | 4/1994 | Ewen |
| 5,304,869 A | 4/1994 | Greason |
| 5,315,591 A | 5/1994 | Brent |
| 5,323,392 A | 6/1994 | Ishii |
| 5,329,192 A | 7/1994 | Wu |
| 5,331,509 A | 7/1994 | Kikinis |
| 5,345,449 A | 9/1994 | Buckingham |
| 5,349,649 A | 9/1994 | Iijima |
| 5,361,397 A | 11/1994 | Wright |
| 5,363,121 A | 11/1994 | Freund |
| 5,373,149 A | 12/1994 | Rasmussen |
| 5,373,506 A | 12/1994 | Tayloe |
| 5,390,206 A | 2/1995 | Rein |
| 5,392,023 A | 2/1995 | D'Avello |
| 5,406,615 A | 4/1995 | Miller |
| 5,406,643 A | 4/1995 | Burke |
| 5,418,837 A | 5/1995 | Johansson |
| 5,420,529 A | 5/1995 | Guay |
| 5,423,002 A | 6/1995 | Hart |
| 5,426,637 A | 6/1995 | Derby |
| 5,428,636 A | 6/1995 | Meier |
| 5,430,845 A | 7/1995 | Rimmer |
| 5,434,518 A | 7/1995 | Sinh |
| 5,437,329 A | 8/1995 | Brooks |
| 5,440,560 A | 8/1995 | Rypinski |
| 5,455,527 A | 10/1995 | Murphy |
| 5,457,412 A | 10/1995 | Tamba |
| 5,459,412 A | 10/1995 | Mentzer |
| 5,465,081 A | 11/1995 | Todd |
| 5,473,607 A | 12/1995 | Hausman |
| 5,481,265 A | 1/1996 | Russell |
| 5,481,562 A | 1/1996 | Pearson |
| 5,488,319 A | 1/1996 | Lo |
| 5,502,719 A | 3/1996 | Grant |
| 5,510,734 A | 4/1996 | Sone |
| 5,510,748 A | 4/1996 | Erhart |
| 5,519,695 A | 5/1996 | Purohit |
| 5,521,530 A | 5/1996 | Yao |
| 5,533,029 A | 7/1996 | Gardner |
| 5,535,373 A | 7/1996 | Olnowich |
| 5,544,222 A | 8/1996 | Robinson |
| 5,548,230 A | 8/1996 | Gerson |
| 5,548,238 A | 8/1996 | Zhang |
| 5,550,491 A | 8/1996 | Furuta |
| 5,576,644 A | 11/1996 | Pelella |
| 5,579,487 A | 11/1996 | Meyerson |
| 5,583,456 A | 12/1996 | Kimura |
| 5,583,859 A | 12/1996 | Feldmeier |
| 5,584,048 A | 12/1996 | Wieczorek |
| 5,600,267 A | 2/1997 | Wong |
| 5,603,051 A | 2/1997 | Ezzet |
| 5,606,268 A | 2/1997 | Van Brunt |
| 5,619,497 A | 4/1997 | Gallagher |
| 5,625,308 A | 4/1997 | Matsumoto |
| 5,628,055 A | 5/1997 | Stein |
| 5,630,061 A | 5/1997 | Richter |
| 5,640,356 A | 6/1997 | Gibbs |
| 5,640,399 A | 6/1997 | Rostoker |
| 5,668,809 A | 9/1997 | Rostoker |
| 5,675,584 A | 10/1997 | Jeong |
| 5,675,585 A | 10/1997 | Bonnot |

(56) References Cited

U.S. PATENT DOCUMENTS

| | | |
|---|---|---|
| 5,680,038 A | 10/1997 | Fiedler |
| 5,680,633 A | 10/1997 | Koenck |
| 5,689,644 A | 11/1997 | Chou |
| 5,724,361 A | 3/1998 | Fiedler |
| 5,726,588 A | 3/1998 | Fiedler |
| 5,732,346 A | 3/1998 | Lazaridia |
| 5,740,366 A | 4/1998 | Mahany |
| 5,742,604 A | 4/1998 | Edsall |
| 5,744,366 A | 4/1998 | Kricka |
| 5,744,999 A | 4/1998 | Kim |
| 5,748,631 A | 5/1998 | Bergantino |
| 5,754,549 A | 5/1998 | DeFoster |
| 5,767,699 A | 6/1998 | Bosnyak |
| 5,778,414 A | 7/1998 | Winter |
| 5,796,727 A | 8/1998 | Harrison |
| 5,798,658 A | 8/1998 | Werking |
| 5,802,258 A | 9/1998 | Chen |
| 5,802,287 A | 9/1998 | Rostoker |
| 5,802,465 A | 9/1998 | Hamalainen |
| 5,802,576 A | 9/1998 | Tzeng |
| 5,805,927 A | 9/1998 | Bowes |
| 5,821,809 A | 10/1998 | Boerstler |
| 5,826,027 A | 10/1998 | Pedersen |
| 5,828,653 A | 10/1998 | Goss |
| 5,829,025 A | 10/1998 | Mittal |
| 5,831,985 A | 11/1998 | Sandorfi |
| 5,839,051 A | 11/1998 | Grimmett |
| 5,844,437 A | 12/1998 | Asazawa |
| 5,848,251 A | 12/1998 | Lomelino |
| 5,859,669 A | 1/1999 | Prentice |
| 5,861,881 A | 1/1999 | Freeman |
| 5,875,465 A | 2/1999 | Kilpatrick |
| 5,877,642 A | 3/1999 | Takahashi |
| 5,887,146 A | 3/1999 | Baxter |
| 5,887,187 A | 3/1999 | Rostoker |
| 5,892,382 A | 4/1999 | Ueda |
| 5,892,922 A | 4/1999 | Lorenz |
| 5,893,150 A | 4/1999 | Hagersten |
| 5,893,153 A | 4/1999 | Tzeng |
| 5,903,176 A | 5/1999 | Westgate |
| 5,905,386 A | 5/1999 | Gerson |
| 5,908,468 A | 6/1999 | Hartmann |
| 5,909,127 A | 6/1999 | Pearson |
| 5,909,686 A | 6/1999 | Muller |
| 5,914,955 A | 6/1999 | Rostoker |
| 5,937,169 A | 8/1999 | Connery |
| 5,940,771 A | 8/1999 | Gollnick |
| 5,945,847 A | 8/1999 | Ransijn |
| 5,945,858 A | 8/1999 | Sato |
| 5,945,863 A | 8/1999 | Coy |
| 5,961,631 A | 10/1999 | Devereux |
| 5,969,556 A | 10/1999 | Hayakawa |
| 5,974,508 A | 10/1999 | Maheshwari |
| 5,977,800 A | 11/1999 | Iravani |
| 5,978,379 A | 11/1999 | Chan |
| 5,978,849 A | 11/1999 | Khanna |
| 5,987,507 A | 11/1999 | Creedon |
| 6,002,279 A | 12/1999 | Evans |
| 6,008,670 A | 12/1999 | Pace |
| 6,014,041 A | 1/2000 | Somasekhar |
| 6,014,705 A | 1/2000 | Koenck |
| 6,025,746 A | 2/2000 | So |
| 6,026,075 A | 2/2000 | Linville |
| 6,028,454 A | 2/2000 | Elmasry |
| 6,037,841 A | 3/2000 | Tanji |
| 6,037,842 A | 3/2000 | Bryan |
| 6,038,254 A | 3/2000 | Ferraiolo |
| 6,061,351 A | 5/2000 | Erimli |
| 6,061,747 A | 5/2000 | Ducaroir |
| 6,064,626 A | 5/2000 | Stevens |
| 6,081,162 A | 6/2000 | Johnson |
| 6,094,074 A | 7/2000 | Chi |
| 6,098,064 A | 8/2000 | Pirolli |
| 6,104,214 A | 8/2000 | Ueda |
| 6,111,425 A | 8/2000 | Bertin |
| 6,111,859 A | 8/2000 | Godfrey |
| 6,114,843 A | 9/2000 | Olah |
| 6,118,776 A | 9/2000 | Berman |
| 6,122,667 A | 9/2000 | Chung |
| 6,151,662 A | 11/2000 | Christie |
| 6,157,623 A | 12/2000 | Kerstein |
| 6,178,159 B1 | 1/2001 | He |
| 6,185,185 B1 | 2/2001 | Bass |
| 6,188,339 B1 | 2/2001 | Hasegawa |
| 6,194,950 B1 | 2/2001 | Kibar |
| 6,202,125 B1 | 3/2001 | Patterson |
| 6,202,129 B1 | 3/2001 | Palanca |
| 6,209,020 B1 | 3/2001 | Angie |
| 6,215,497 B1 | 4/2001 | Leung |
| 6,218,878 B1 | 4/2001 | Ueno |
| 6,222,380 B1 | 4/2001 | Gerowitz |
| 6,223,239 B1 | 4/2001 | Olarig |
| 6,223,270 B1 | 4/2001 | Chesson |
| 6,226,680 B1 | 5/2001 | Boucher |
| 6,232,844 B1 | 5/2001 | Talaga |
| 6,243,386 B1 | 6/2001 | Chan |
| 6,259,312 B1 | 7/2001 | Murtojarvi |
| 6,265,898 B1 | 7/2001 | Bellaouar |
| 6,266,797 B1 | 7/2001 | Godfrey |
| 6,269,427 B1 | 7/2001 | Kuttanna |
| 6,279,035 B1 | 8/2001 | Brown |
| 6,310,501 B1 | 10/2001 | Yamashita |
| 6,324,181 B1 | 11/2001 | Wung |
| 6,332,179 B1 | 12/2001 | Okpisz |
| 6,349,098 B1 | 2/2002 | Purruck |
| 6,349,365 B1 | 2/2002 | McBride |
| 6,356,944 B1 | 3/2002 | McCarty |
| 6,363,011 B1 | 3/2002 | Hirose |
| 6,366,583 B2 | 4/2002 | Rowett |
| 6,373,846 B1 | 4/2002 | Daniel |
| 6,374,311 B1 | 4/2002 | Mahany |
| 6,385,201 B1 | 5/2002 | Iwata |
| 6,396,832 B1 | 5/2002 | Kranzler |
| 6,396,840 B1 | 5/2002 | Rose |
| 6,424,194 B1 | 7/2002 | Hairapetian |
| 6,424,624 B1 | 7/2002 | Galand |
| 6,427,169 B1 | 7/2002 | Elzur |
| 6,427,171 B1 | 7/2002 | Craft |
| 6,434,620 B1 | 8/2002 | Boucher |
| 6,438,651 B1 | 8/2002 | Slane |
| 6,449,656 B1 | 9/2002 | Elzur |
| 6,459,681 B1 | 10/2002 | Oliva |
| 6,463,092 B1 | 10/2002 | Kim |
| 6,470,029 B1 | 10/2002 | Shimizu |
| 6,484,224 B1 | 11/2002 | Robins |
| 6,496,479 B1 | 12/2002 | Shionozaki |
| 6,535,518 B1 | 3/2003 | Hu |
| 6,538,486 B1 | 3/2003 | Chen |
| 6,564,267 B1 | 5/2003 | Lindsay |
| 6,597,689 B1 | 7/2003 | Chiu |
| 6,606,321 B1 | 8/2003 | Natanson |
| 6,614,791 B1 | 9/2003 | Luciani |
| 6,614,796 B1 | 9/2003 | Black |
| 6,631,351 B1 | 10/2003 | Ramachandran |
| 6,633,936 B1 | 10/2003 | Keller |
| 6,636,947 B1 | 10/2003 | Neal |
| 6,649,343 B1 | 11/2003 | Hirota |
| 6,658,599 B1 | 12/2003 | Linam |
| 6,665,759 B2 | 12/2003 | Dawkins |
| 6,675,200 B1 | 1/2004 | Cheriton et al. |
| 6,681,283 B1 | 1/2004 | Thekkath et al. |
| 6,744,782 B1 | 6/2004 | Itakura |
| 6,757,291 B1 | 6/2004 | Hu |
| 6,757,746 B2 | 6/2004 | Boucher |
| 6,766,389 B2 | 7/2004 | Hayter |
| 6,788,686 B1 | 9/2004 | Khotimsky |
| 6,788,704 B1 | 9/2004 | Lindsay |
| 6,816,932 B2 | 11/2004 | Cho |
| 6,845,403 B2 | 1/2005 | Chadalapaka |
| 6,850,521 B1 | 2/2005 | Kadambi |
| 6,859,435 B1 | 2/2005 | Lee |
| 6,862,296 B1 | 3/2005 | Desai |
| 6,865,158 B2 | 3/2005 | Iwamoto |
| 6,874,054 B2 | 3/2005 | Clayton |

(56) References Cited

U.S. PATENT DOCUMENTS

| | | | |
|---|---|---|---|
| 6,897,697 B2 | 5/2005 | Yin |
| 6,904,519 B2 | 6/2005 | Anand |
| 6,911,855 B2 | 6/2005 | Yin |
| 6,912,603 B2 | 6/2005 | Kanazashi |
| 6,927,606 B2 | 8/2005 | Kocaman |
| 6,937,080 B2 | 8/2005 | Hairapetian |
| 6,938,092 B2 | 8/2005 | Burns |
| 6,971,006 B2 | 11/2005 | Krishna |
| 6,975,629 B2 | 12/2005 | Welin |
| 6,976,205 B1 | 12/2005 | Ziai |
| 6,982,583 B2 | 1/2006 | Yin |
| 7,007,103 B2 | 2/2006 | Pinkerton |
| 7,009,985 B2 | 3/2006 | Black |
| 7,159,030 B1 | 1/2007 | Elzur |
| 7,181,531 B2 | 2/2007 | Pinkerton |
| 7,212,534 B2 | 5/2007 | Kadambi |
| 7,295,555 B2 * | 11/2007 | Elzur | 370/394 |
| 7,346,701 B2 | 3/2008 | Elzur |
| 7,362,769 B2 | 4/2008 | Black |
| 7,366,190 B2 | 4/2008 | Black |
| 7,376,755 B2 | 5/2008 | Pandya |
| 7,382,790 B2 | 6/2008 | Warren |
| 7,385,972 B2 | 6/2008 | Black |
| 7,397,788 B2 | 7/2008 | Mies |
| 7,397,800 B2 | 7/2008 | Elzur |
| 7,400,639 B2 | 7/2008 | Madukkarumukumana |
| 7,411,959 B2 | 8/2008 | Elzur |
| 7,430,171 B2 | 9/2008 | Black |
| 7,515,612 B1 | 4/2009 | Thompson |
| 7,586,850 B2 | 9/2009 | Warren |
| 8,135,016 B2 * | 3/2012 | Elzur | 370/394 |
| 8,345,689 B2 | 1/2013 | Elzur |
| 8,451,863 B2 * | 5/2013 | Elzur | 370/469 |
| 2001/0026553 A1 | 10/2001 | Gallant |
| 2001/0037397 A1 | 11/2001 | Boucher |
| 2002/0078265 A1 | 6/2002 | Frazier |
| 2002/0085562 A1 | 7/2002 | Hufferd |
| 2002/0089927 A1 | 7/2002 | Fischer |
| 2002/0095519 A1 | 7/2002 | Philbrick |
| 2002/0103988 A1 | 8/2002 | Dornier |
| 2002/0130692 A1 | 9/2002 | Hairapetian |
| 2002/0174253 A1 | 11/2002 | Hayter |
| 2002/0190770 A1 | 12/2002 | Yin |
| 2002/0194400 A1 | 12/2002 | Porterfield |
| 2003/0001646 A1 | 1/2003 | Hairapetian |
| 2003/0016628 A1 | 1/2003 | Kadambi |
| 2003/0021229 A1 | 1/2003 | Kadambi |
| 2003/0038809 A1 | 2/2003 | Peng |
| 2003/0046330 A1 | 3/2003 | Hayes |
| 2003/0046418 A1 | 3/2003 | Raval |
| 2003/0061505 A1 | 3/2003 | Sperry |
| 2003/0067337 A1 | 4/2003 | Yin |
| 2003/0079033 A1 | 4/2003 | Craft |
| 2003/0084185 A1 * | 5/2003 | Pinkerton | 709/236 |
| 2003/0105977 A1 | 6/2003 | Brabson |
| 2003/0107996 A1 | 6/2003 | Black |
| 2003/0108050 A1 | 6/2003 | Black |
| 2003/0108058 A1 | 6/2003 | Black |
| 2003/0108060 A1 | 6/2003 | Black |
| 2003/0108061 A1 | 6/2003 | Black |
| 2003/0118040 A1 | 6/2003 | Black |
| 2003/0140124 A1 | 7/2003 | Burns |
| 2003/0169753 A1 | 9/2003 | Black |
| 2003/0172342 A1 | 9/2003 | Elzur |
| 2003/0174720 A1 | 9/2003 | Black |
| 2003/0174721 A1 | 9/2003 | Black |
| 2003/0174722 A1 | 9/2003 | Black |
| 2003/0198251 A1 | 10/2003 | Black |
| 2003/0204631 A1 | 10/2003 | Pinkerton |
| 2003/0204634 A1 | 10/2003 | Pinkerton |
| 2004/0019652 A1 | 1/2004 | Freimuth |
| 2004/0042458 A1 | 3/2004 | Elzu |
| 2004/0042464 A1 | 3/2004 | Elzur |
| 2004/0042483 A1 | 3/2004 | Elzur |
| 2004/0042487 A1 | 3/2004 | Ossman |
| 2004/0044798 A1 | 3/2004 | Elzur |
| 2004/0062245 A1 | 4/2004 | Sharp |
| 2004/0062275 A1 | 4/2004 | Siddabathuni |
| 2004/0081186 A1 | 4/2004 | Warren |
| 2004/0085972 A1 | 5/2004 | Warren |
| 2004/0085994 A1 | 5/2004 | Warren |
| 2004/0093411 A1 | 5/2004 | Elzur |
| 2004/0133713 A1 | 7/2004 | Elzur |
| 2004/0227544 A1 | 11/2004 | Yin |
| 2005/0027911 A1 | 2/2005 | Hayter |
| 2005/0160139 A1 | 7/2005 | Boucher |
| 2005/0165980 A1 | 7/2005 | Clayton |
| 2005/0184765 A1 | 8/2005 | Hairapetian |
| 2005/0185654 A1 | 8/2005 | Zadikian |
| 2005/0216597 A1 | 9/2005 | Shah |
| 2005/0278459 A1 | 12/2005 | Boucher |
| 2006/0165115 A1 | 7/2006 | Warren |
| 2006/0176094 A1 | 8/2006 | Hairapetian |
| 2007/0170966 A1 | 7/2007 | Hairapetian |
| 2007/0171914 A1 | 7/2007 | Kadambi |
| 2007/0237163 A1 | 10/2007 | Kadambi |
| 2008/0025315 A1 | 1/2008 | Elzur |
| 2008/0095182 A1 | 4/2008 | Elzur |
| 2008/0151922 A1 | 6/2008 | Elzur |
| 2008/0205421 A1 | 8/2008 | Black |
| 2008/0276018 A1 | 11/2008 | Hayter |
| 2008/0298369 A1 | 12/2008 | Elzur |
| 2009/0074408 A1 | 3/2009 | Black |
| 2009/0128380 A1 | 5/2009 | Hairapetian |
| 2010/0220729 A1 | 9/2010 | Elzur |
| 2010/0223540 A1 | 9/2010 | Elzur |

FOREIGN PATENT DOCUMENTS

| | | |
|---|---|---|
| EP | 1345382 A2 | 9/2003 |
| EP | 1357721 A2 | 10/2003 |
| EP | 1460804 A2 | 9/2004 |
| EP | 1460805 A2 | 9/2004 |
| EP | 1460806 A2 | 9/2004 |
| EP | 1206075 B1 | 11/2007 |
| EP | 1537695 B1 | 2/2009 |
| FR | 2725573 A1 | 11/1994 |
| FR | 19940012105 | 4/1996 |
| JP | 1188301 | 7/1989 |
| JP | 11243420 | 9/1999 |
| JP | 2001045092 | 2/2001 |
| JP | 20011313717 | 11/2001 |
| WO | WO99/00948 | 1/1999 |
| WO | WO00/56013 | 9/2000 |
| WO | WO02/35784 | 5/2002 |
| WO | WO03/079612 | 9/2003 |

OTHER PUBLICATIONS

Fibre Channel Arbitration Loop (FC-AL), X3.262-199x, X3T11/Project 960D/Rev. 4.5, working draft proposal, American National Standard for Information Technology, Jun. 1, 1995, pp. i-x, 1-92.

Emulex Corporation's Answer, Affirmative Defenses, and Counterclaims, Demand for Jury Trial, *Broadcom Corporation* vs. *Emulex Corporation*, Case No. SACV 09-1058-JVS (ANx), Nov. 4, 2009.

Plaintiff Broadcom Corporation's Opening Markman Brief, United States District Court, Central District of California, Southern Division, *Broadcom Corporation* v. *Elulex Corporation*, Case No. SACV09-01058 JVS (ANx), SACV10-03963-JVS (ANx), dated Oct. 18, 2010.

Defendant and Counterclaim Plaintiff Emulex Corporation's Opening Claim Construction Brief, United States District Court, Central District of California, *Broadcom Corporation* v. *Emulex Corporation*, Case No. SACV09-1058-JVS (ANx) consilidated with CV 10-3963 JVS (ANx), dated Oct. 18, 2010.

Exhibit A: Disputed Terms, Proposed Constructions, and Intrinsic and Extrinsic Evidence, *Broadcom Corporation* v. *Emulex Corporation*, Case No. 8:09-cv-01058-JVS-AN.

Defendant Emulex Corporation's First Amended Disclosure of Preliminary Invalidity Contentions, with Exhibit B, *Broadcom Corporation* vs. *Emulex Corporation*, Case No. SACV 09-1058-JVS (ANx), Jun. 28, 2010.

(56) References Cited

OTHER PUBLICATIONS

Ewen, "Single-Chip 1062 Mbaud CMOS Transceiver for Serial Data communication", 1995 IEEE International Solid-State Circuits Conference, Digest of Technical Papers, First Edition, Feb. 1995, pp. 1-2, 6-13, 32-33, 336, IEEE Catalog No. 95CH35753, Publisher: John H. Wuorinen, Castine, ME 04421.
Fiedler, "A 1.0625Gbps Transceiver with 2x-Oversampling and Transmit Signal Pre-Emphasis", 1997 IEEE International Solid-State Circuits Conference, Digest of Technical Papers, ISSCC97, Session 15, Serial Data Communications, Paper FP 15.1, pp. 238-239, 464.
Fujimori, "A 90-dB SNR 2.5-MHz Output-Rate ADC Using Cascaded Multibit Delta-Sigma Modulation at 8x Oversampling Ratio", IEEE Journal of Solid-State Circuits, vol. 35, No. 12, Dec. 2000, pp. 1820-1828.
Corner, "A CMOS Phase Detector for Mixed Signal ASIC Application", IEEE, 1993, pp. 232-234.
Fiedler, "A CMOS Pulse Density Modulator for High-Resolution A/D Converters", IEEE Journal of Solid-State Circuits, vol. sc-19, No. 6, Dec. 1984, pp. 995-996.
Momtaz, "A Fully Integrated SONET OC-48 Transceiver in Standard CMOS", IEEE Journal of Solid-State Circuits, vol. 36, No. 12, Dec. 2001, pp. 1964-1973.
Schmitt, "A Low Voltage CMOS Current Source", In proceeding of: Proceedings of the 1997 International Symposium on Low Power Electronics and Design, 1997, Monterey, California, USA, Aug. 18-20, 1997, pp. 110-113.
Hairapetian, "An 81-MHz If Receiver in CMOS", IEEE Journal of Solid-State Circuits, vol. 31, No. 12, Dec. 1996, pp. 1981-1986.
Ang, "An Evaluation of an Attempt at Offloading TCP/IP Protocol Processing Onto an i960RN-Based iNIC", Hewlett Packard, 2001, pp. 1-33.
Fischer, "CiNIC-Calpoly Intelligent NIC", A Thesis Presented to the Faculty of California Polytechnic State University, San Luis Obispo, Jun. 2001, pp. i-xi, 1-137.
Tanenbaum, Excerpt from Computer Networks, Third Edition, 1996, Publisher: Prentice Hall PTF, Upper Saddle River, New Jersey 07458, pp. 556-558.
Allstot, "Current-Mode Logic Techniques for CMOS Mixed-Mode ASIC's", IEEE Custom Integrated Circuits Conference, 1991, pp. 25.2.1-25.2.4.
Shivam, "EMP: Zero-copy OS-bypass NIC-Driven Gigabit Ethernet Message Passing", SC1001 Nov. 2001, Denver, CO, pp. 1-8.
Nayfeh, "Exploring the Design Space for a Shared-Cache Multiprocessor", Computer Systems Laboratory, Stanford University, IEEE, 1994, pp. 166-175.
Fibre Channel Arbitration Loop (FC-AL), X3.262-199x, X3T11/Project 960D/Rev. 4.5, working draft proposal, American National Standard for Information Technology, Jun. 1, 1995, pp. i-x, 1-92.
Fibre Channel Physical and Signaling Interface (FC-PH), X3.230-199x, X3T11 Project 755D/Rev. 4.3, working draft proposal, American National Standard for Information Systems, Jun. 1, 1994, pp. i-xxxiv, 1-338, Index.
Yeh, "Introduction to TCP/IP Offload Engine (TOA)", 10 Gigabit Ethernet Alliance, Version 1.0, Apr. 2002, pp. 1-6.
Sanchez, "Iterations in TCP/IP—Ethernet Network Optimization", a Master's thesis presented to the Faculty of California, Polytechnic State University, San Luis Obispo, Jun. 1999, pp. i-xiii, 1-156.
Allam, "Low Power CMOS Logic Families", IEEE, 1999, pp. 419-422.
Hairapetian, "Low-Temperature Mobility Measurements on CMOS Devices", IEEE Transactions on Electron Devices, vol. 36, No. 8, Aug. 1989, pp. 1448-1455.
Cao, "OC-192 Transmitter and Receiver in Standard 0.18-um CMOS", IEEE Journal of Solid-State Circuits, vol. 37, No. 12, Dec. 2002, pp. 1768-1780.
Series H: Audiovisual and Multimedia Systems, Infrastructure of Audiovisual Services—Systems and Terminal Equipment for Audiovisual Services; Visual Telephone Systems and Equipment for Local Area Networks Which Provide a Non-Guaranteed Quality of Serives, ITU-T Recommendation H.323, Superseded by a more recent version, Nov. 1996, pp. i-v, 1-71, 1.
Pinkerton, "The Case for RDMA", May 29, 2002, pp. 1-27.
Pope, "Tip of the Week: Net-Interface Accelerators Can Help or Hinder", Network Systems Design Line, Feb. 26, 2007, http://www.networksystemsdesignline.com, pp. 1-2.
Dally, "Virtual-Channel Flow Control", IEEE Transactions on Parallel and Distributed Systems, vol. 3, No. 2, Mar. 1992, pp. 194-205.
Emulex Corporation's Answer, Affirmative Defenses, and Counterclaims, Demand for Jury Trial, *Broadcom Corporation*vs. *Emulex Corporation*,Case No. SACV 09-1058-JVS (ANx), Nov. 4, 2009.
European Search Report corresponding to European Patent Application No. 03791992.5-1244, dated Sep. 7, 2010.
Plaintiff Broadcom Corporation's Opening Markman Brief, United States Districk Court, Central District of California, Southern Division, *Broadcom Corporation*v. *Elulex Corporation*,Case No. SACV09-01058 JVS (ANx), SACV10-03963-JVS (ANx), dated Oct. 18, 2010.
Defendant and Counterclaim Plaintiff Emulex Corporation's Opening Claim Construction Brief, United States District Court, Central District of California, *Broadcom Corporation*v. *Emulex Corporation*,Case No. SACV09-1058-JVS (ANx) consilidated with CV 10-3963 JVS (ANx), dated Oct. 18, 2010.
Plaintiff Broadcom Corporation's Reply Markman Brief, United States District Court, Central District of California, Southern Division, Broadcom Corporation v. Emulex Corporation, Case No. SACV09-01058 JVS (ANx), SACV 1003963-JVS (ANx), dated Nov. 8, 2010.
Defendant and Counterclaim Plaintiff Emulex Corporation's Reply Claim Construction Brief, United States District Court, Central District of California, Broadcom Corporation v. Emulex Corporation, Case No. SACV 09-1058-JVS (ANx) consolidated with CV 10-3963 JVS (ANx), dated Nov. 8, 2010.
Order Regarding Markman/Claim Construction Hearing, United States District Court, Central District of California, Broadcom Corporation v. Emulex Corporation, Case No. SACV 09-01058-JVS (ANx) consolidated SACV 10-03963-JVS (Anx), dated Dec. 17, 2010.
Joint Claim Construction and Prehearing Statement Pursuant to N.D. Cal. Patent L.R. 4-3, United States District Court, Central District, Southern Division, Broadcom Corporation v. Emulex Corporation, Case No. SACV09-1058 JVS (ANx), SACV 10-03963-JVS (ANx). Exhibit A: Disputed Terms, Proposed Constructions, and Intrinsic and Extrinsic Evidence, *Broadcom Corporation*v. *Emulex Corporation,* Case No. 8:09-cv-01058-JVS-AN.
Pinkerton, et al., Internet Draft, "WARP Architectural Requirements Summary", Jan. 2001, pp. 1-10.
Satran, et al., IPS Internet Draft, "iSCSI", Jan. 20, 2002, pp. 1-20.
Satran, J., Design Team Memo, "iSCSI—fragments, packets, synchronization and RDMA", Jul. 10, 2000, pp. 1-10.
Haagens, R., "TCP ULP Message Framing iSCSI Framing", May 10, 2001, pp. 1-26.
Haagens, R. and Romanow, A., "TCE ULP Message Framing iSCSI Framing", Jul. 5, 2000, pp. 1-31.
Bailey, et al., Transport Area Working Group, Internet-Draft, "ULP Framing for TCP", Jul. 6, 2001, pp. 1-20.
Bailey, et al., Transport Area Working Group, Internet-Draft, "TCP ULP Framing Protocol (TUP)", Nov. 2001, pp. 1-10.
Elz, R., IETF Network Working Group, Request for Comments: 1982, "Serial Number Arithmetic", Aug. 1996, pp. 1-10.
Defendant Emulex Corporation's Disclosure of Preliminary Invalidity Contentions, with Exhibit B, *Broadcom Corporation* vs. *Emulex Corporation,* Case No. SACV 09-1058-JVS (ANx), Jun. 28, 2010.
Defendant Emulex Corporation's First Amended Disclosure of Preliminary Invalidity Contentions, with Exhibit B, *Broadcom Corporation*vs. *Emulex Corporation,*Case No. SACV 09-1058-JVS (ANx), Jun. 28, 2010.

\* cited by examiner

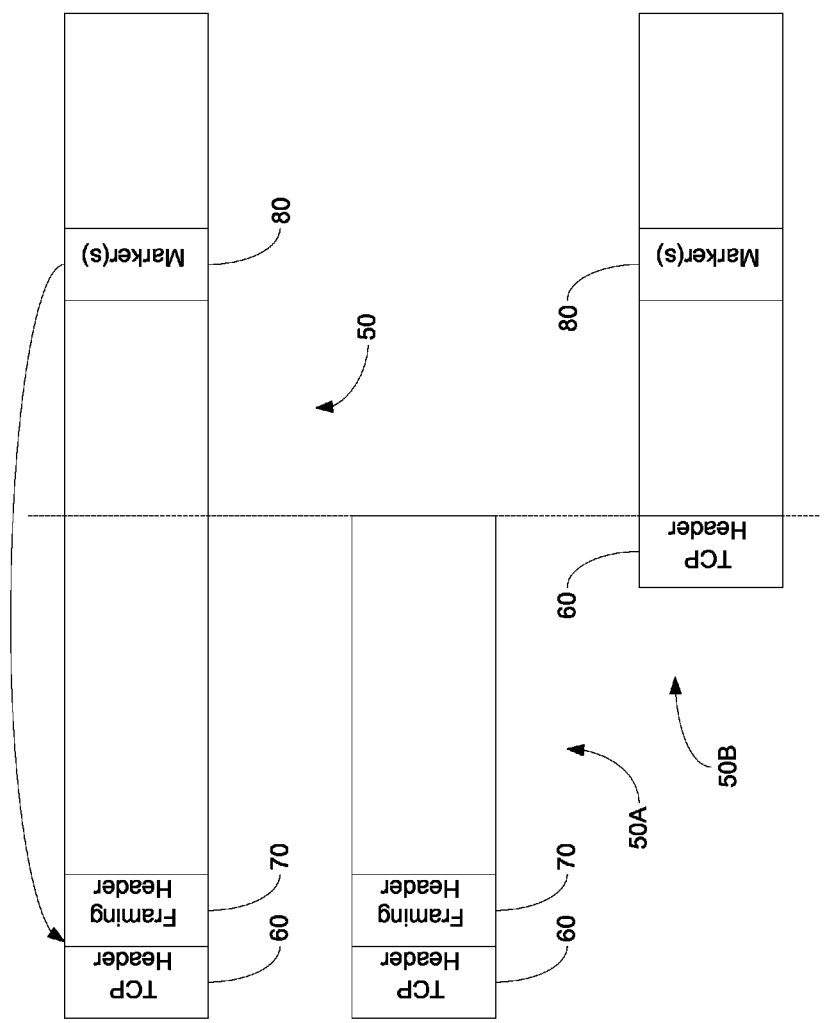

SYSTEM AND METHOD FOR IDENTIFYING UPPER LAYER PROTOCOL MESSAGE BOUNDARIES

RELATED APPLICATIONS

This application is a continuation of U.S. patent application Ser. No. 12/758,484, filed Apr. 12, 2010, which is a continuation of U.S. patent application Ser. No. 11/868,655 (now U.S. Pat. No. 8,135,016), filed Oct. 8, 2007, which is a continuation of U.S. patent application Ser. No. 10/230,643 (now U.S. Pat. No. 7,295,555), filed Aug. 29, 2002, which makes reference to, claims priority to and claims benefit from U.S. Provisional Patent Application Ser. No. 60/363,381, entitled "Method of Identifying ULP Header in TCP Stream," filed on Mar. 8, 2002; U.S. Provisional Patent Application Ser. No. 60/363,356, entitled "Method of Identifying ULP Header in TCP Stream," filed on Mar. 11, 2002; U.S. Provisional Patent Application Ser. No. 60/372,852, entitled "Method for Marker Based Re-Segmentation Detection," filed on Apr. 16, 2002; and U.S. Provisional Patent Application Ser. No. 60/372,851, entitled "Method for Marker Based Re-Segmentation Detection," filed on Apr. 16, 2002.

INCORPORATION BY REFERENCE

The above-referenced United States patent applications are hereby incorporated herein by reference in their entirety.

BACKGROUND OF THE INVENTION

The transmission control protocol/internet protocol (TCP/IP) is a protocol that has become widely used for communications. However, receiving, buffering, processing and storing the data communicated in TCP segments can consume a substantial amount of host processing power and memory bandwidth at the receiver. In a typical system, reception includes processing in multiple communications layers before the data is finally copied to its final destination an Application buffer. A typical network interface card (NIC) processes the Layer 2 headers (e.g., ethernet headers) and then copies the remaining headers (e.g., Layer 3 and higher headers) and/or the Upper Layer Protocol (ULP) payload to a transport buffer (e.g., a TCP buffer) for networking and transport layer processing. The transport and networking processing (e.g., TCP/IP where TCP is the transport layer protocol) removes the Layer 3 and Layer 4 headers and copies the remaining headers and ULP payload to another buffer. This process repeats in the next level until the last header is removed and the ULP payload is copied to the buffer assigned by the application. Most of the bytes in the frames are payload (e.g., data), but it is copied again and again as the control portion of the frames (e.g., the headers) is processed in a layered fashion. The host CPU, which incurs high overhead of processing and copying including, for example, handling many interrupts and context switching, does this. Thus, very few cycles are available for application processing, which is the desired use of a server machine. For high-speed networking (e.g., 10 Gigabits per second), the additional copying strains the memory sub-system of the computer. For an average of three data copies, the memory subsystem of most commercially available server computers becomes a bottleneck, thereby preventing the system from supporting 10 Gigabit network traffic. Since TCP/IP is the dominant transport protocol used by most applications today, it would therefore be useful to ease the burden of this processing to achieve, for example, scalable low CPU utilization when communicating with a peer machine.

What is needed to reduce the overhead is to ensure data is copied once from the wire to the application buffer. A problem is that the NIC has no idea what portion of a received frame is, for example, ULP data and what portion is ULP control. What is needed is to have the sender build the frames in a way that makes it easy for the receiver NIC to make this distinction. However, each ULP protocol may have its own way of mixing data and control, thereby making it very difficult to build a NIC that supports them all.

Another problem is that TCP offers a byte stream service to the ULP. It is not always possible to tell the beginning of a ULP message (e.g., the protocol data unit (PDU)) inside that endless stream of bytes (e.g., the TCP data). Assuming that the frames arrive without resegmentation at the receiver (e.g., a server), the receiver may unpack the frame using TCP and might be able to locate the ULP header. The ULP header may include, for example, control information that may identify a location in the application buffer where the ULPDU may be directly placed. However, even if a sender could somehow be adapted to employ, in every TCP segment, a TCP layer adapted to place ULP control information starting in the first payload byte of the TCP segment, it might not be enough. This is because resegmentation is not uncommon in TCP/IP communications. There is no guarantee the TCP segments will arrive on the other end of the wire, the way the sender has built them because, for example, there may be network architectural structures between the sender and the receiver. For example, an intermediate box or middle box (e.g., a firewall) may terminate the TCP connection with the sender and, without the sender or the receiver being aware, may initiate another TCP connection with the receiver. The intermediate box may resegment the incoming frames (e.g., use a smaller TCP payload). Thus, a single frame may enter the intermediate box, but a plurality of smaller frames, each with its own TCP header may exit the intermediate box. This behavior by the middle box may disrupt the nicely placed control and data portions.

In the case of resegmentation, the receiver may face a number of challenges. For example, the receiver may not be aware that there are any intermediate boxes between the sender and the receiver. In addition, the initial segmenting scheme used by the sender may not be the segmenting scheme received by the receiver. Thus, although the receiver may be able to order the smaller frames, the receive may be unable to locate, for example, the ULP header and the ULPDU. Accordingly, the receiver may not be able to ascertain the control and boundary information that may be necessary to correctly place the ULPDU in the proper location of, for example, the application buffer of the receiver.

Another problem is that TCP/IP networks may deliver segments out of order. The ULP may have a PDU larger than one TCP segment, which may be limited to 1460 bytes when used on top of the ethernet, and the ULPDU may be split among a plurality of TCP segments. Therefore, some TCP segments may contain, for example, only data and no control information that may instruct the receiving NIC as to where to place the data. The receiver is faced with a choice of dropping the out-of-order segments and requesting a retransmission, which is costly in terms of delay and performance loss, or buffering the out-of-order segments until all the missing segments have been received. Some implementations may choose to accumulate all the out-of-order segments, to wait for the missing TCP segments to be received and then to place them in order. The receiving NIC may then process the whole set of TCP segments, as it uses the control portion to obtain data placement information. This process adds the cost for the temporary buffer and uses high power CPU and wider data path than otherwise. The receiving NIC processes all the accumulated TCP segments in parallel to process other TCP segments at wire speed since traffic on the link continues all the time. The out-of-order segments may create a "processing bubble" for the receiver.

A proposed solution for locating the ULP header is to use the TCP ULP framing (TUF) protocol. According to the TUF protocol, a sender places a special value (i.e., a key) within the TCP segment as the first byte following the TCP header as illustrated in FIG. 1. The key may be a unique value (e.g., a particular 48-bit value) for which the receiver may search. Accordingly, when the receiver finds the key, the receiver has also found, for example, the ULP header or the beginning of the control information (e.g., the first byte of the DDP/RDMA header). However, the TUF protocol has a probabilistic nature. For example, the unique value may occur by accident within the ULPDU. Furthermore, in the face of, for example, resegmentation or TCP retransmission (e.g., from an improper TCP sender) the receiver may misidentify the beginning of the control information, resulting in the silent corruption of the data due to placement in the wrong host memory location. Although the unique value can be increased in length to reduce such a misidentification event, the probability always exists. The key may also present a security risk if an unauthorized receiver is able to obtain the unique value allowing the unauthorized receiver to access the ULP payload.

Another solution to locating a particular header is to use a fixed interval markers (FIM) protocol. The FIM protocol uses only forward-pointing markers and has been limited to internet small computer system interface (iSCSI) applications. In the FIM protocol, a forward-pointing marker is placed in a known location inside the TCP byte stream. This enables the receiver to possibly locate it in the endless TCP byte stream. The FIM marker points forward to the beginning of the iSCSI header as shown in FIG. 2. The marker is placed, by default, every 8192 bytes, although this is negotiable. However, the FIM protocol may have a disadvantage, because the marker is placed only sparingly, every 8192 bytes. Accordingly, a lot of frames may need to be buffered before or if the iSCSI header is to be identified. Other iSCSI headers may have no FIM marker pointing to them such that the receiver has to process the TCP segments in order to be able to place the iSCSI data. The FIM protocol also does not provide a guarantee that the iSCSI header is located following the TCP header or that the iSCSI header is even placed in its entirety in one TCP segment. To use the FIM protocol, the receiver has to store locally the TCP sequence location pointed to by that FIM. It uses this when the TCP segment with that location is received (i.e., additional state information for every FIM received is stored until the corresponding TCP segment with the iSCSI header is received). The FIM protocol does not provide any suggestion or teaching as to the processing of out-of-order TCP segments if the received out-of-order TCP segments are less than the FIM distance (e.g., 8192 bytes in the default). The FIM protocol is also limited to iSCSI applications and may not provide a generic solution for the framing problem that may be needed by all applications using high speed TCP/IP protocol.

Further limitations and disadvantages of conventional and traditional approaches will become apparent to one of ordinary skill in the art through comparison of such systems with some aspects of the present invention as set forth in the remainder of the present application with reference to the drawings.

BRIEF SUMMARY OF THE INVENTION

Aspects of the present invention may be found in, for example, systems and methods that identify an Upper Layer Protocol (ULP) message boundaries. In one embodiment, the present invention may provide a method that identifies ULP message boundaries. The method may include one or more of the following steps: attaching a framing header of a frame to a data payload to form a packet, the framing header being placed immediately after the byte stream transport protocol header, the framing header comprising a length field comprising a length of a framing PDU; and inserting a marker in the packet, the marker pointing backwards to the framing header and being inserted at a preset interval.

In another embodiment, the present invention may provide a method that locates a marker header in a received TCP frame. The method may include one or more of the following steps: locating a backwards-pointing marker; and using information stored in the backwards-pointing marker to locate the framing header.

In another embodiment, the present invention may provide a method that detects resegmentation of a TCP segment. The method may include one or more of the following steps: locating a backwards-pointing marker in the TCP segment; determining a location of a framing header using information stored in the backwards-pointing marker; and determining that resegmentation of the TCP segment has occurred if the framing header is not at the front of the TCP segment after a TCP header of the TCP segment.

In another embodiment, the present invention may provide a method that detects resegmentation of a TCP segment. The method may include one or more of the following steps: locating a backwards-pointing marker in the TCP segment; determining a location of a framing header using information stored in the backwards-pointing marker; and determining that resegmentation of the TCP segment has occurred if the backwards-pointing marker points to a location outside of the TCP segment.

In another embodiment, the present invention may provide a method that detects resegmentation of a TCP segment. The method may include one or more of the following steps: locating a backwards-pointing marker in the TCP segment; determining a location of a framing header using information stored in the backwards-pointing marker; and determining that resegmentation of the TCP frame has occurred if a number of payload bytes in the TCP segment is not equal a number indicated by a framing header length field plus a pad and a CRC field.

In another embodiment, the present invention may provide a method that detects resegmentation of a TCP segment. The method may include one or more of the following steps: locating a backwards-pointing marker in the TCP segment; determining a location of a framing header using information stored in the backwards-pointing marker; and determining that resegmentation of the TCP frame has occurred if a number of payload bytes in the TCP segment is not equal to a sum of all values of a framing header length fields plus pads and CRC fields for multiple framing PDUs placed in a TCP segment.

In yet another embodiment, the present invention may provide a method that detects a potential error in a byte stream transport protocol segment by comparing a received error detection code with a computed error detection code over a framing PDU. The method may include one or more of the following steps: if the comparing occurs before byte stream transport protocol processing, then discarding received segment and relying on the byte stream transport recovery protocol without need for specific framing layer recovery; if the comparing occurs after the byte stream transport protocol processing, then tearing down connection; and allowing for additional protection beyond the byte stream transport checksum protocol.

In yet another embodiment, the present invention may provide a method in which no information is stored from one TCP segment to allow the processing of another TCP segment.

In yet another embodiment, the present invention may provide a method that provides additional protection of a marker by attaching, to the marker, 16 bits of error detecting code such as a cyclical redundancy checking (CRC), for example, CRC16.

In yet another embodiment, the present invention may provide a method that allows additional information to be carried in the reserved bits (e.g., 16 reserved bits) of the Marker. For example, this can be another marker for a ULP specific purpose or any other useful data that can be carried in a sequence of these 16 bit entities. For example, the reserved field can be used for signaling between 2 ULPs.

In some embodiments, the present invention may define a framing protocol that enables the receiver to identify the beginning of ULP control and data portions embedded in the TCP/IP byte stream. Every TCP segment may be self-describing to allow data placement when received in order or out of order. Layered on top of the framing protocol may be, for example, a direct data placement/remote direct memory access (DDP/RDMA) protocol header. The DDP/RDMA header may carry the information as to the buffer to be used and offset into that buffer. Once the receiver finds the DDP/RDMA field, it may tell the control and data portions apart and place the ULP data without processing the protocol specific control information. The upper layer (UL) may form a ULP packet by placing ULP control information or a ULP data unit (ULPDU) as a payload for the Lower Layer Protocol (e.g., RDMA/DDP). The RDMA/DDP PDU may be placed into a framing PDU. The TCP layer may form a TCP segment by attaching a TCP header to the ULP/RDMA/DDP/framing packet. The packets may pass through other layers of the protocol stack (e.g., the ethernet layer) before being placed on a data link (e.g., a wire) as frames by the sender (e.g., a client).

These and other features and advantages of the present invention may be appreciated from a review of the following detailed description of the present invention, along with the accompanying figures in which like reference numerals refer to like parts throughout.

BRIEF DESCRIPTION OF THE DRAWINGS

FIG. 11 shows an embodiment of the resegmentation of a TCP frame according to the present invention.

DETAILED DESCRIPTION OF THE INVENTION

Figure 1:
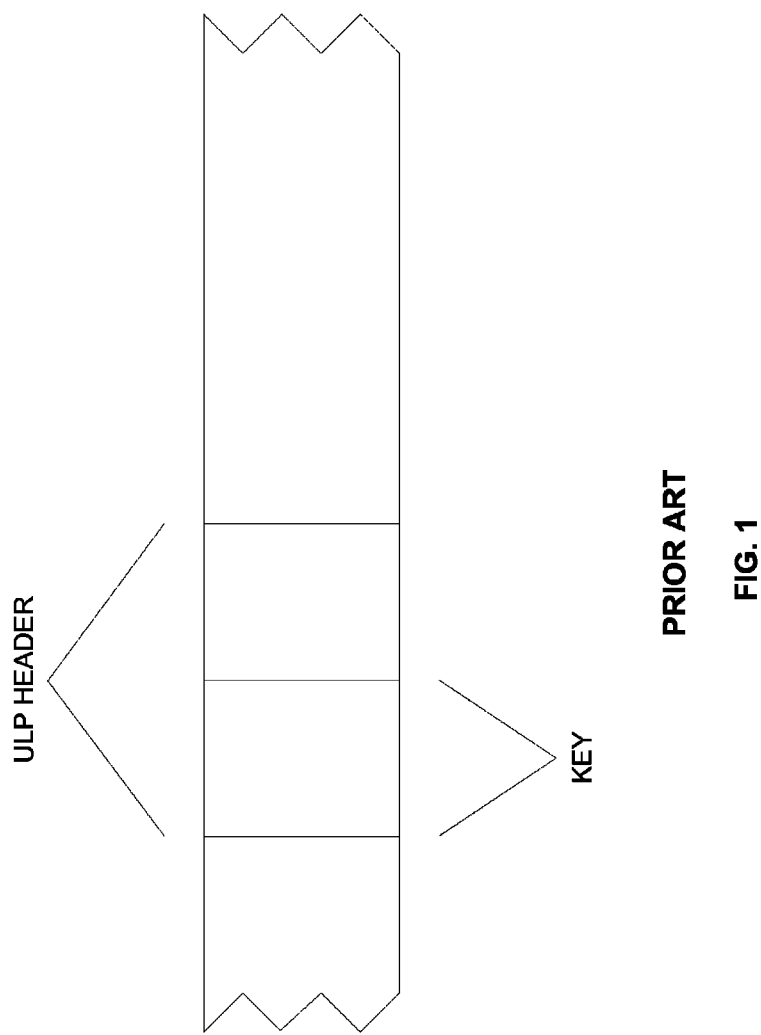
FIG. 1 shows an example of the TUF protocol.
Figure 2:
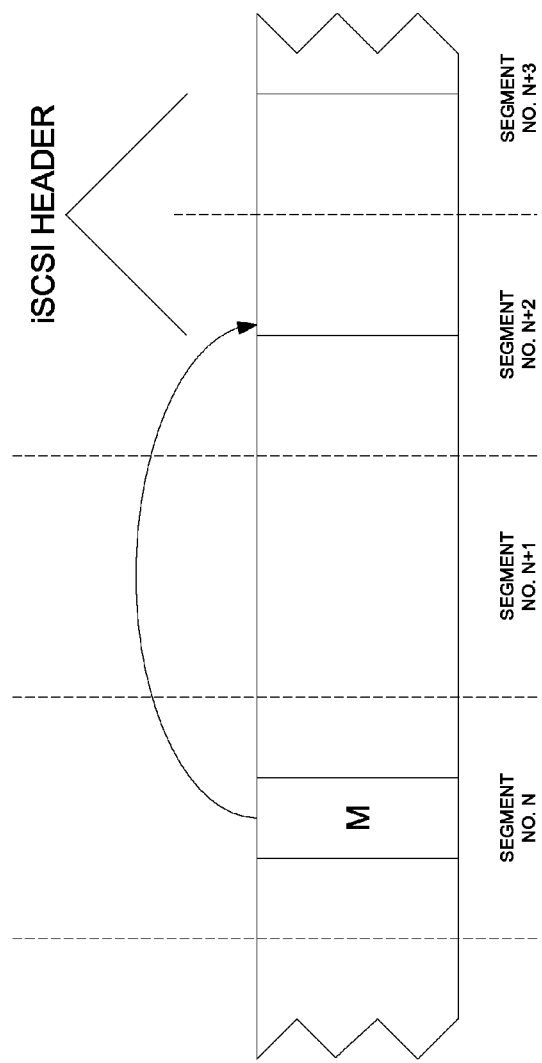
FIG. 2 shows an example of the FIM protocol for use with iSCSI.
Figure 3:
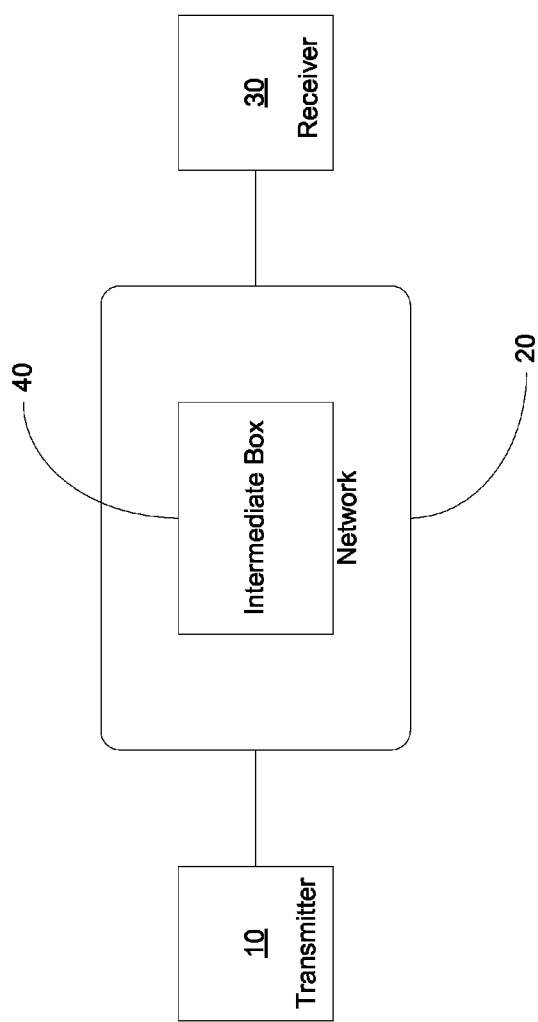
FIG. 3 shows an embodiment of a system that may provide frame marking according to the present invention.

FIG. 3 shows an embodiment of a system that may provide a method for identifying Upper Layer Protocol (ULP) message boundaries. For example, the method may identify ULP message boundaries in a byte stream transport protocol (e.g., a framing protocol). A transmitter 10 (e.g., a client) may be coupled to a receiver 30 (e.g., a server) via a network 20 such as, for example, the internet. The network 20 may optionally include an intermediate box 40. A TCP connection may be initiated between the transmitter 10 and the receiver 30. The intermediate box 40 (e.g., a firewall) may terminate the TCP connection of the transmitter 10 and may initiate another TCP connection with the receiver 30. The intermediate box 40 may receive a first set of TCP frames from the transmitter 10 and resegment the first set of TCP frames into a second set of TCP frames. The resegmentation of the first set of TCP frames may, for example, result in smaller TCP frames. In such a case, the TCP frame scheme sent by the transmitter 10 may not be the TCP frame scheme received by receiver 30.

Figure 4:
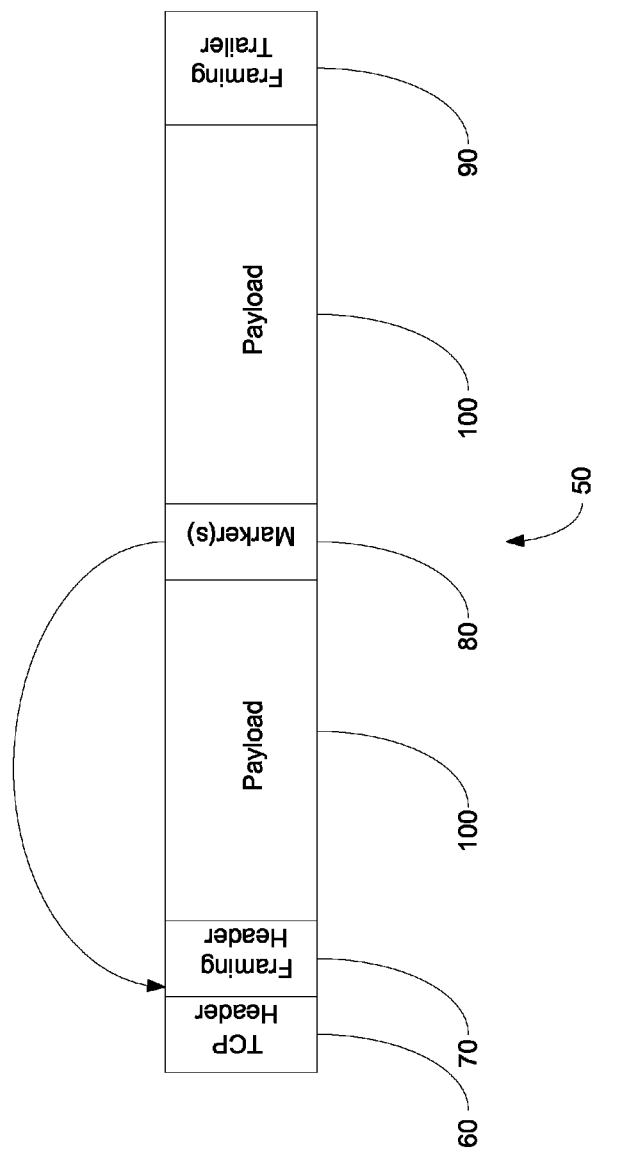
FIG. 4 shows an embodiment of a TCP frame according to the present invention.
Figure 5:
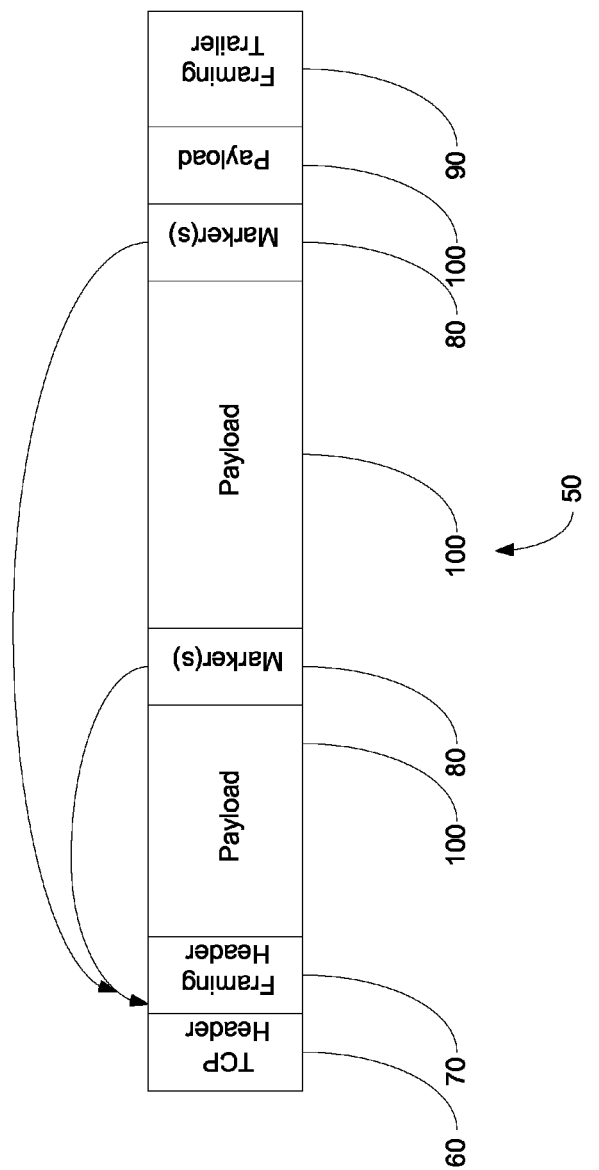
FIG. 5 shows an embodiment of a TCP frame according to the present invention.

FIGS. 4 and 5 show embodiments of TCP frames according to the present invention. The TCP frame 50 may include, for example, a TCP header 60; a framing header 70; one or more markers 80; a framing trailer 90 possibly including, for example, a pad or a cyclical redundancy checking (CRC); and a payload 100 that may include, for example, ULP data. FIG. 4 shows an embodiment in which one marker 80 is inside the TCP frame 50 and FIG. 5 shows an embodiment in which two markers 80 are inside the TCP frame 50. Although shown with one or two markers 80 inside the TCP frame 50, zero, three or more markers may be present inside the TCP frame 50. The TCP header 60 may be a conventional TCP header 60 and may provide, for example, location information within the TCP sequence number space. The CRC 90 may optionally be employed for error detection. The CRC 90 may cover, for example, the framing header 70, the one or more markers 80, the payload 100 and the pad, if present. Other types of error detection or error correction may also be used instead of or in addition to the CRC 90. For example, the CRC may use CRC-32c.

Figure 6:
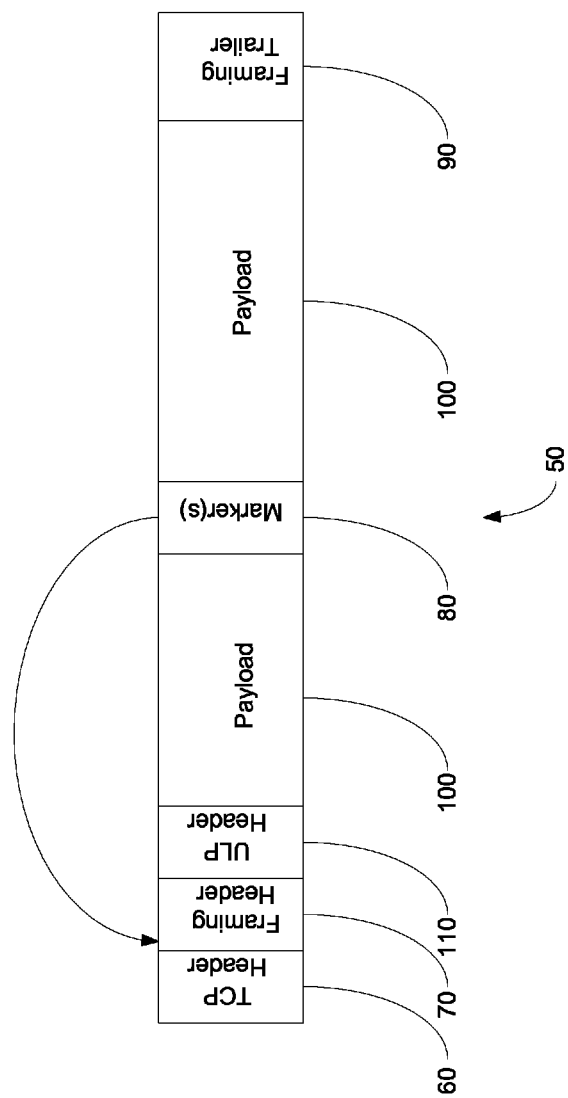
FIG. 6 shows an embodiment of a TCP frame according to the present invention.

The framing header 70 (e.g., a marker header) may be disposed after the TCP header 60. In one embodiment, the framing header 70 generally must follow immediately after the last byte of TCP header 60, which may include any potential TCP options, in the TCP frame 50. The sender 10 may guarantee that all TCP segments (including retransmissions) have the framing header 70 as the first byte immediately following the TCP header (plus options if used). The framing header 70 may include information such as, for example, data information or control information (e.g., ULP control information). The framing header 70 may also provide information relating to boundaries of the payload 100 corresponding to the framing header 70. In addition, the ULP header 110 may include specific information as to which memory (e.g., an application buffer) and, specifically, where in the memory of the receiver 10 the payload 100 should be placed (e.g., stored). The ULP header 110 may include, for example, a DDP/RDMA header/trailer or other types of ULP headers/trailers. FIG. 6 shows an embodiment of a TCP frame 50 that includes the framing header 70 and a separate DDP/RDMA header 110.

Figure 7:
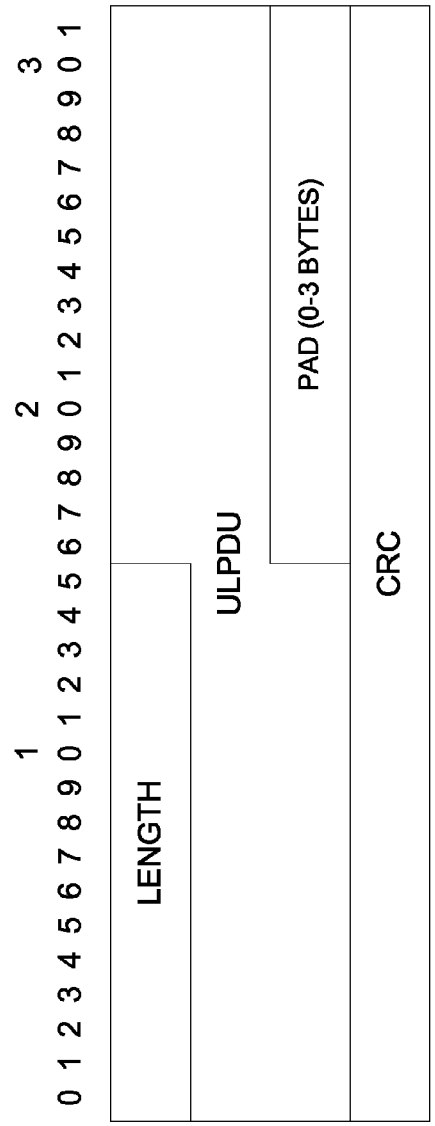
FIG. 7 shows an embodiment of a marker header and trailer format according to the present invention

FIG. 7 shows an embodiment of a marker header format according to the present invention. A payload length may indicate the length in bytes of the ULPDU contained in the TCP segment. It might not include the length of the framing header itself, the pad, the CRC or any markers that may be present in the framing PDU. The ULPDU may be, for example, the ULP data (or the ULP control). The pad may provide, for example, up to three bytes to make the frame a modulo 4 byte in length. The CRC may be, for example, a CRC-32c. In one example, the total length in bytes of the ULPDU and framing headers and trailer placed inside the TCP packet may be payload length plus the length of the CRC (e.g., 4 bytes for CRC-32c) plus the number of pad bytes.

There may be multiple framing PDUs inside one TCP segment. Each of them may be processed independently by the receiver 30.

The marker 80 is generally a backward pointing marker. The marker 80 may point backwards to the beginning of the framing header 70, thereby identifying the framing header 70. If more than one marker 80 is present in the TCP frame 50, then one or more markers may point backwards to the same framing header 70 as shown in FIG. 5. In one embodiment, all of the markers 80 in the TCP frame 50 point to the framing header 70. Thus unlike the TUF protocol, the identification of the ULP message boundary (e.g., beginning of the framing header) is fully deterministic and is not subject to any probabilistic failure. Thus, unlike the FIM protocol, buffering may be minimized since every TCP segment that carries a marker 80 is self descriptive and allows the receiver 30 to locate the buffer placement information carried inside that segment, for example, in the ULP header 110. The marker 80 can be used to derive the buffer placement information placed, for example, in the ULP header, whether the TCP segment has been received in order or out of order. A TCP segment may be received in order, for example, if all the previous TCP segments with lower TCP sequence numbers that can be legally received are within the TCP "window". Even a TCP segment that has been received out of order, but carries a marker 80, can be processed for placing the ULP data it contains since the marker 80 points to the framing header 70. From the framing header 70, the receiver 30 may detect the ULP header 110 that may contain the buffer information. The TCP header may be processed separately according to the TCP protocol.

The marker 80 may be placed in the TCP stream at a preset interval by the transmitter 10. For example, the marker 80 may be placed every 512 bytes in the TCP stream. If the preset interval is small enough (e.g., smaller than smallest transport segment), then a marker may be present in almost every TCP segment 50 or in every TCP segment 50. If the TCP segment is shorter than the preset interval, then there is no guarantee a marker will be present in the TCP segment. If a marker 80 is still present in the short TCP frame 50 (e.g., a TCP segment shorter than the preset interval), then the framing header 70 may be located and the TCP segment 50 may be processed as described above (e.g., the payload 100 may be directly placed in the proper location within the application buffer). If, on the other hand, a marker 80, is not present the receiver 30 may still place the payload 100 inside the TCP segment according to information that may be in the ULP header 110, if the TCP segment has been received in order (e.g., all previous TCP segments with lower TCP sequence number that can be legally received, for example, are within the TCP window, have been received). In this case, even if an intermediate box is present and it has resegmented the TCP byte stream, this segment can still be processed. This is due to the fact that the previous segments were processed and, if there was no error, then it is known that next byte placed by the sender in the TCP byte stream is the first byte of the framing header 70. Another case occurs when the TCP segment is received out of order with no marker. In this case, the receiver places the TCP segment it has received in a temporary buffer (or drops the TCP segment and processes only in order), thereby eliminating any need for a buffer with a slight performance degradation. The buffer size may be small and may be calculated approximately as, for example, the preset interval multiplied by the number of TCP holes the receiver wants to support per every TCP connection. In contrast, the FIM protocol requires a buffer size of the FIM interval plus a maximum transmission unit (MTU) multiplied by the number of TCP holes and the data contained in the marker for every marker, multiplied by the number of TCP connections. The receiver may statistically set aside fewer resources since not all connections may experience out of order TCP segments at the same time. If the receiver runs out of buffer for out-of-order TCP segments, the receiver may drop all subsequent TCP segments received out of order, until some of the buffer has been freed due to, for example, the plugging of holes in the TCP stream.

The TCP frames 50 may be self-descriptive. In addition, unlike the FIM protocol, the receiver 30 does not necessarily have to carry state information from one frame to another frame. Since most every TCP frame 50 may include a marker 80, then most every TCP frame 50 may be processed independently. Independent processing of the TCP frames 50 may substantially reduce buffering needs, especially in a TCP environment in which TCP frames 50 may be out of order upon reaching the receiver 30.

Placing the marker 80 at a preset interval may also provide the receiver 30 with known locations in the TCP stream in which to find the marker 80. Thus, the relative location of the marker 80 with respect to the TCP header 60 may vary from TCP frame 50 to TCP frame 50. The receiver 30 may determine location information within the TCP sequence number space from the TCP headers 60. In one example in which the marker 80 is placed every 512 bytes in the TCP stream, the receiver 30 may perform a modulo 512 operation to locate the marker 80. As the TCP sequence space may start from a non-zero value, which may vary from one TCP connection to another TCP connection, the preset interval may be calculated by subtracting the initial non-zero value from the TCP sequence number carried inside the TCP header and performing a modulo 512 on the result. Unlike the FIM protocol, the ability to start using the framing protocol without negotiation eliminates any additional latencies in getting the two machines to communicate with the benefits of a framing protocol. It may also save on the additional code that may need to be written and stored on the NIC to perform the negotiation.

The present invention also contemplates that, instead of the preset interval, the transmitter 10 and the receiver 30 may negotiate an interval. Furthermore, out-of-band communications may be used to adjust the marker interval. The value of the marker interval may be adjusted by the ULP at some time after initialization. This may allow a balance between wire protocol overhead and receiver side resegmentation buffer size per connection.

Figure 8:
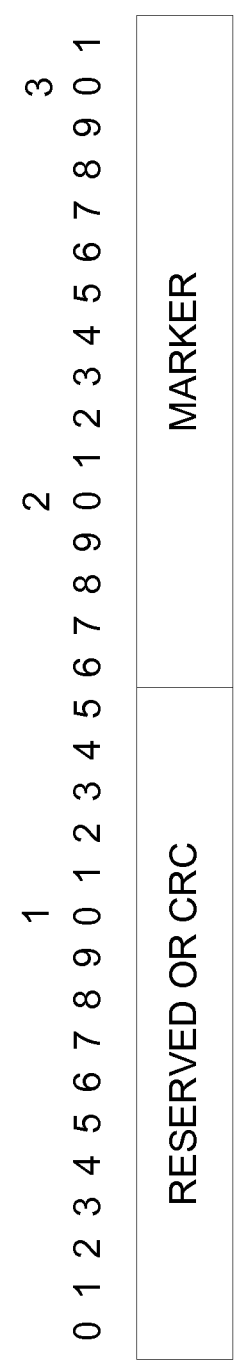
FIG. 8 shows an embodiment of a marker format according to the present invention.

FIG. 8 shows an embodiment of a marker format according to the present invention. In one embodiment, the marker is 32 bits in length. The first 16 bits (MSB) may indicate the offset to the beginning of the framing header 70. The 16-bit marker may be interpreted as a 16-bit unsigned integer that carries the number of bytes in the TCP sequence space from the first byte of the framing header 70 to the marker 80. For example, if the initial TCP sequence space starts at byte 12 and the current TCP segment has the first payload byte located at byte 112 in the TCP sequence space. The next marker may be located at the 32-bit field located in byte 524, assuming a marker interval of 512 bytes, in the TCP sequence space. The marker may have the value of 412 (i.e., subtract 112 from 524). In one embodiment, since the fields of the TCP segment formatted for framing are 4-byte aligned, the last 2 bits of the marker are zeroes. The next 16 bits (LSB) may be reserved for another framing (e.g., NFS) or other another signaling function. In one embodiment, the next 16 bits (LSB) may be a repeat of the first 16 bits. In another embodiment, the next 16 bits (LSB) may carry error correction or error detection code (e.g., CRC-16) to protect the contents of the marker. In yet another embodiment, the next 16 bits (LSB) may carry ULP specific information and serve a communication channel between the ULPs or be used to point to some ULP specific field (e.g., a second marker pointing to an NFS header for example). In another embodiment, the 16-bit fields may be swapped. Unlike the FIM protocol, the overhead of the marker may be only 32 bits. The FIM protocol has 2 copies of the same marker each occupying 32 bits as the interval between markers may be long and a middle box may resegment in the middle of one marker. One embodiment of the present invention may, for example, require only one copy of the marker.

Figure 9A:
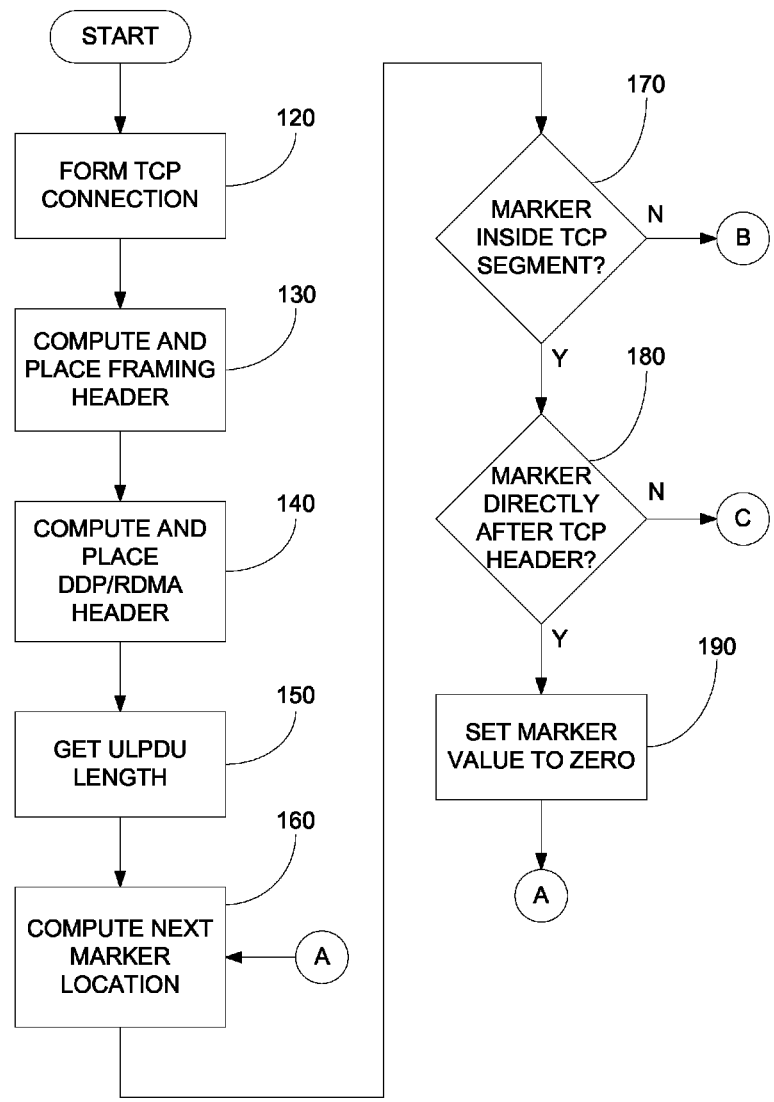
FIGS. 9A-B show a flowchart of an embodiment of a process for marking frames according to the present invention.
Figure 9B:
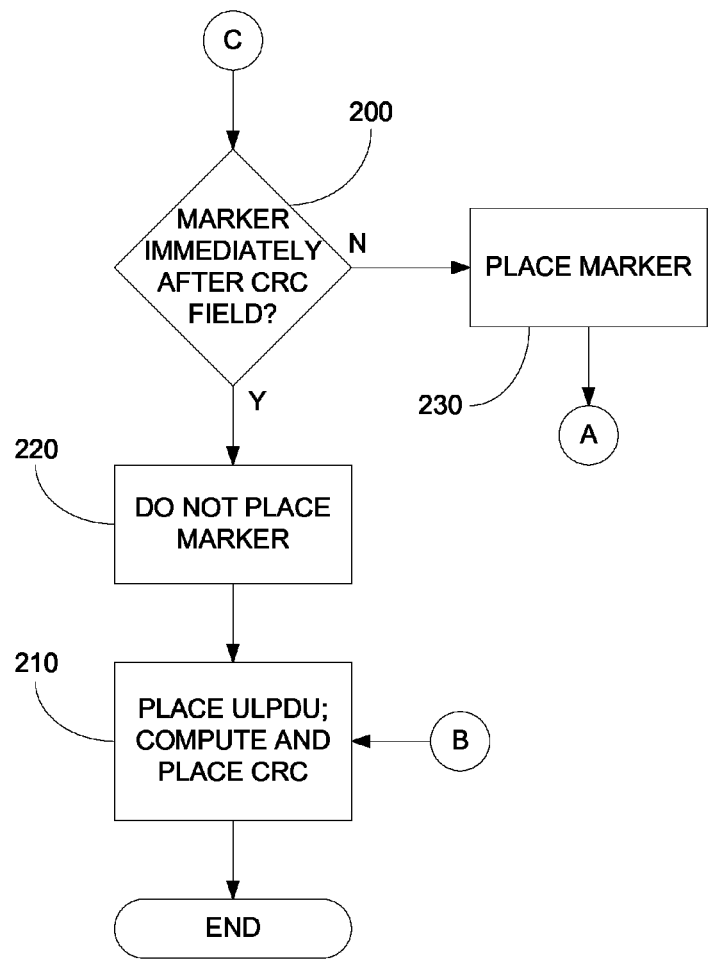
Figure 10A:
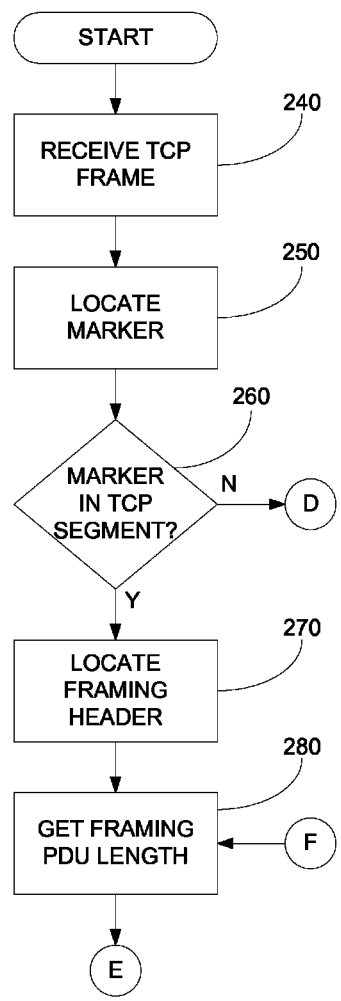
FIGS. 10A-D show a flowchart of an embodiment of a process for receiving TCP frames according to the present invention.
Figure 10B:
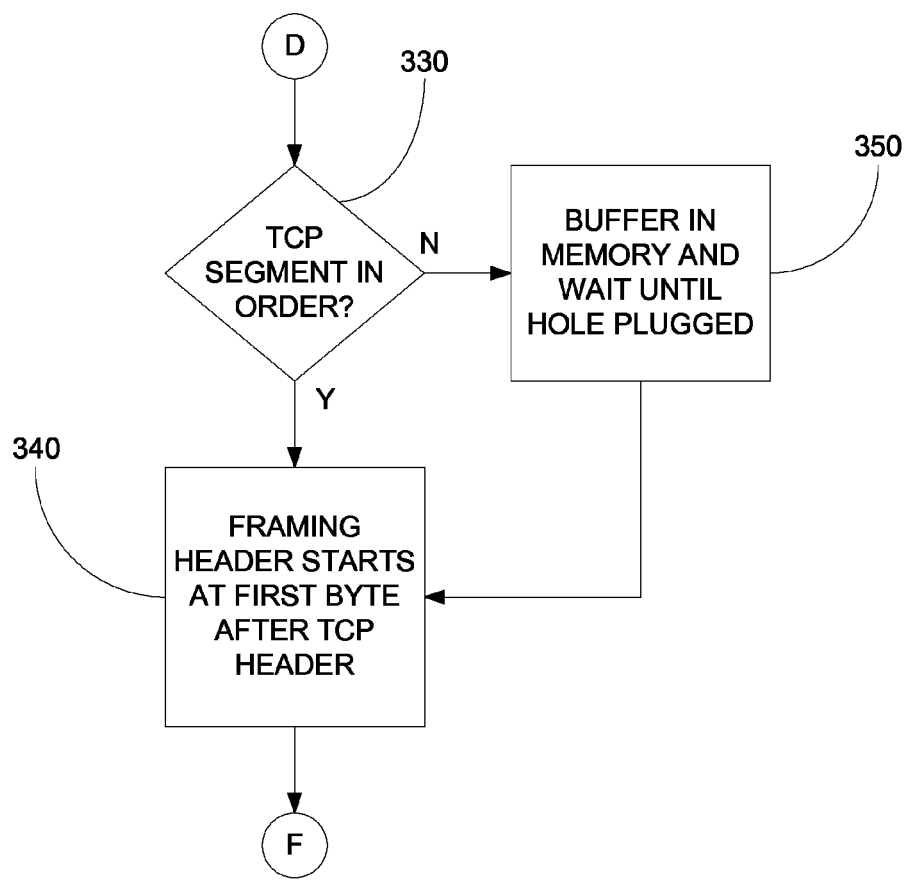
Figure 10C:
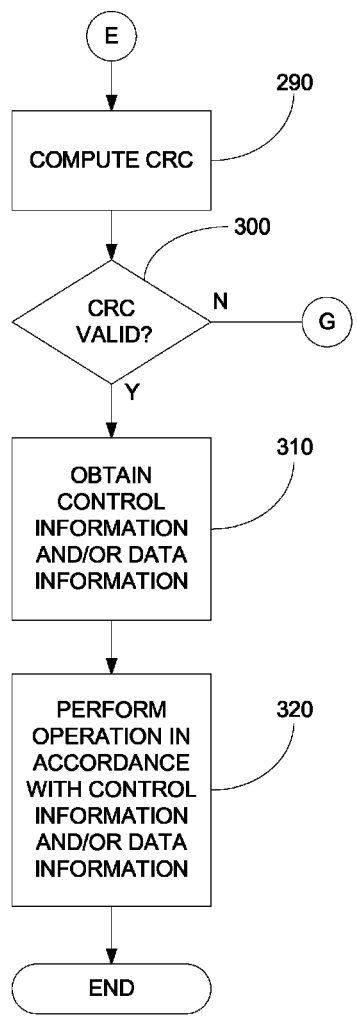
Figure 10D:
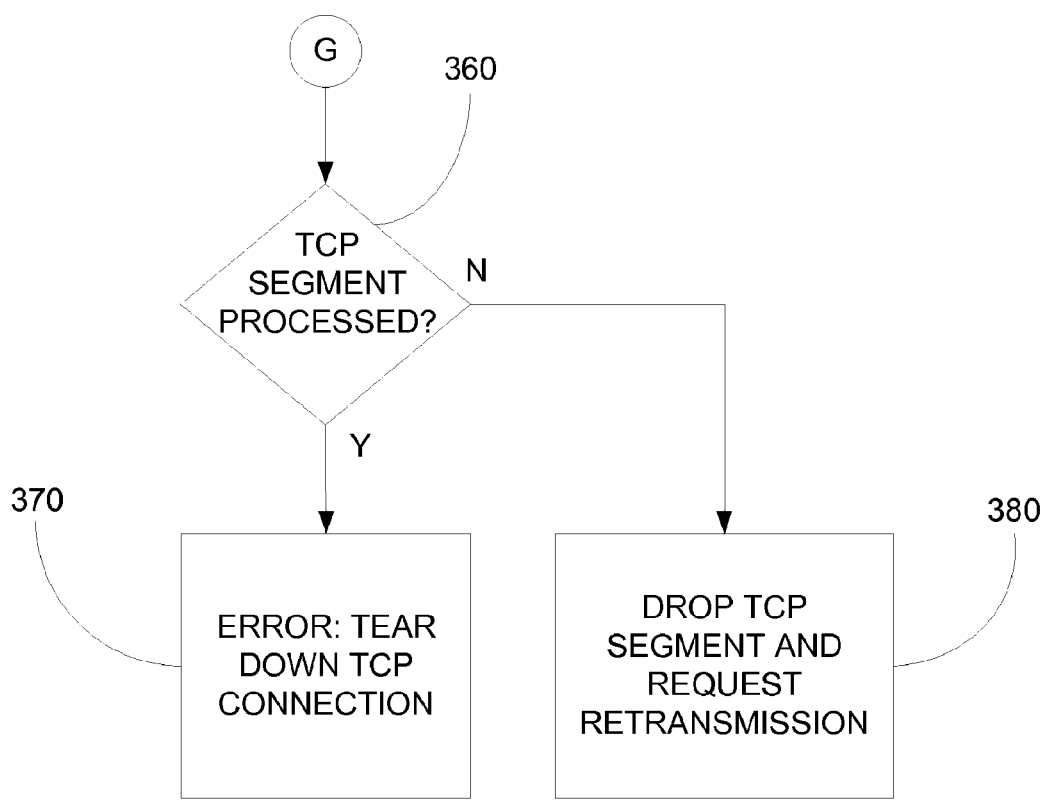

In operation, the transmitter 10 may employ a protocol stack that includes upper layers (ULs) as well as, for example, TCP/IP layers in forming the TCP frames 50. FIGS. 9A-B show a flowchart of an embodiment of a process for marking frames according to the present invention. In step 120, a TCP connection may be formed, for example, between the transmitter 10 and the receiver 30. In step 130, the transmitter 10 may place the framing header 70 inside the TCP segment immediately following the TCP header. In step 140, a DDP/RDMA header may be placed in the TCP segment immediately following the framing header 70. In one example, the transmitter 10 may attach a DDP/RDMA header/trailer 110 before attaching the framing header 70. In step 150, the sender 10 may get the ULPDU length and segment it to fit inside one TCP segment. Next the sender 10 may compute the location and content of the one or more markers. In step 160, the sender 10 may compute the location of the next marker, for example, by adding the preset interval to the location of last marker. In step 170, the sender 10 may check to see whether the next marker 80 falls inside the boundaries of the TCP segment. This step may consider, for example, the maximum transmission unit for the TCP segment and the amount of ULPDU data to be transmitted. If the next marker falls outside the boundaries of the TCP segment, then, in step 210, the sender 10 may place the ULPDU data starting immediately after the framing header 70 and the DDP/RDMA header 110, if present (while skipping the one or more markers). If the next marker falls inside the TCP segment, then, in step 180, the sender 10 may check if the next marker falls immediately after the TCP header. If the next marker immediately falls after the TCP header, then, it is placed immediately after the TCP header and before the framing header 70. In step 190, the marker value is set to 0 (i.e., the framing header immediately follows this marker). Then, in step 160, the sender 10 may see whether more markers are to be placed. In query 180, if the next marker is not immediately after the TCP header, then, in query 200, the sender 10 may determine whether the next marker falls in the next byte after the location of the CRC field. If the next marker falls in the next byte after the location of the CRC field, then, in step 220, the marker is not placed. In step 210, since the last marker has been placed, the ULPDU may be placed and the CRC may be computed and placed. If the marker 80, doe not immediately fall after the CRC field, then it falls inside the TCP segment. In step 230, the marker 80 is computed and placed and the process loops back to step 160 to find the location of the next marker 80 in the TCP segment. After all the markers 80 have been placed by the sender 10, then query 170 may proceed to step 210. In step 210, since the last marker has been placed, the ULPDU may be placed around the markers and the CRC may be computed and placed. The CRC may cover the complete framing PDU from the first byte immediately following the TCP header to the last byte of the pad, if present, or the ULPDU data. The CRC computation may be attached at the end of the frame to form the TCP frame 50. Although described in a particular order, the steps may be arranged in a different order and some steps may occur concurrently or may be left out. For example, the marker 80 may be inserted before or concurrently with the attaching of the TCP header 60. Unlike the FIM protocol, the CRC covers the markers enabling, for example, a very simple receiver in which the whole TCP payload except for the last 4 bytes (assumed to be the CRC) is subject to CRC computation. The FIM protocol mechanism requires locating the markers and excluding them from CRC computation, which is a more cumbersome and expensive operation.

The sender 10 may be aware of the path maximum transmission unit (PMTU) and how it may change. The TCP layer variable maximum segment size may be affected by the PMTU. When retransmitting, per the TCP requirements, the sender 10 may segment the byte stream in the same way the original framing PDU has been segmented (e.g., first byte of the framing header to follow the TCP header, the length of the TCP segment may include one complete framing PDU or several complete framing PDUs). The PMTU may change between the first transmission and the retransmission. The sender 10 may still create the TCP segment the it did the first time. If the PMTU has shrunk, then the original segment size may exceed the allowed PMTU. A lower layer mechanism such as, for example, IP fragmentation, may be employed.

In a network in which the PMTU is too small to allow proper operation, the sender 10 may follow an "emergency mode" as outlined in the TUF protocol. The TUF protocol is described, for example, in "TCP ULP Framing Protocol (TUF): draft-ietf-tsvwg-tcp-ulp-frame-01" by Bailey et al. The above-referenced document is hereby incorporated herein by reference in its entirety.

The transmitter 10 may then send the TCP frame 50. FIGS. 10A-D show a flowchart of an embodiment of a process for receiving the TCP frames 50 according to the present invention. In step 240, the TCP frame 50 may be received by the receiver 30. The TCP segment may be in order (e.g., the next expected segment in the TCP sequence number space) or out of order (e.g., a TCP segment that is to the right of the left edge of the TCP Window). In step 250, the receiver 30 may then locate the marker 80 in the TCP frame 50. The receiver 30 may obtain TCP sequence number information from the TCP header for the TCP frame 50. In addition, to locate the marker 80, the receiver 30 may subtract the initial non-zero value of the TCP sequence number for the first TCP payload byte in that particular TCP stream. The receiver 30 may then perform a modulo operation on the TCP sequence numbers using the preset interval at which the marker 80 is located. The receiver 30 need not locate all markers, if more than one is present, since using the one marker may be sufficient. In query 260, the receiver 30 may determine whether a marker is present inside the TCP segment 50. If present, then, in step 270, the receiver 30 may locate the framing header 70 using the information stored in the marker 80. In one example, the marker 80 may be a backward pointer in which a delta value is stored in the marker 80. The delta value may indicate the location of the framing header 70 by indicating the number of bytes backwards from the TCP sequence number of the marker 80 to the TCP sequence number of the beginning of the ULP header 70. In step 280, the receiver 30 may obtain the framing PDU length from the length field inside the framing header 70. In step 290, the receiver 30 may compute the CRC over the whole framing PDU and compare it to the value received in the CRC field of that framing PDU. In query 300, the receiver 30 may determine whether the CRC is valid. If CRC matches, then, in step 310, the receiver 30 may obtain control information and/or data information from the framing header 70 and/or DDP/RDMA header 110. In step 320, the receiver 30 may perform the operation requested in accordance with the control information and/or data information. For example, the DDP/RDMA header 110 may include ULP control information. In another example, the DDP/RDMA header 110 may include boundary information about the ULP payload. In yet another example, the DDP/RDMA header 110 may indicate in which memory (e.g., a particular application buffer) and in which location within the memory the ULPDU data should be directly placed. The receiver 30 may use the framing header length field to see, for example, if a pad is present (i.e., if the length is not an integer multiple of 4 bytes). The receiver 30 may place the ULPDU data in that memory location with out placing the pad bytes (e.g., 0-3 bytes). In query 300, if the CRC does not match per the check done by the receiver 30, then, in query 360, the receiver 30 may determine whether the TCP layer processing has been done for the particular segment, which may be the case for layered implementation with no change to the TCP. If the TCP processing is done for that TCP segment 50, then, in step 370, the receiver 30 may tear down the TCP connection. There may be no way to recover from this error that has been detected by the stronger CRC employed by the framing layer, but that may have slipped through the less rigorous test of the TCP checksum. In query 360, if the framing layer CRC check takes place before the TCP layer processing is done (e.g., a NIC implementing ethernet and IP and TCP and framing where local optimization can be made without breaking conformance to IETF RFCs), then, in step 380, the receiver 30 may silently drop the TCP segment and allow the TCP layer recovery mechanisms to retransmit it. This may reduce or eliminate the need to add error recovery mechanisms in the framing layer (unlike the complex error recovery mechanisms employed by iSCSI), while allowing the framing layer to enjoy the increased integrity of payload protected by CRC.

If the TCP frames 50 are shorter than the preset marker interval of, for example, 512 bytes, then it is possible that the TCP frame 50 may not contain the marker 80. In query 260, the receiver may determine whether the marker is present in the TCP segment. If a marker is not present, then, in query 330, the receiver 30 may determine whether that TCP segment 50 is received in order. If the TCP segments are received in order, then there is no need for buffering and it may be processed right away. In step 340, the receiver 30 may assume, for example, that the framing header begins in the first byte immediately following the TCP header. The process may then loop back to step 280. In query 330, if the TCP segments are received out of order, then, in step 350, the receiver may use limited buffering of approximately 512 bytes since, for example, there may be no more than 512 bytes worth of TCP segments that carry no marker for every hole in the TCP sequence. Once the TCP "hole" is plugged and all previous TCP segments have been processed and found to be error free, the receiver may continue in step 340. If the TCP frames 50 are not received in order and if the receiver 30 may desire to support more than one "hole" in the TCP sequence number space, then additional buffering may be employed (e.g., 512 bytes for every "hole").

Figure 13:
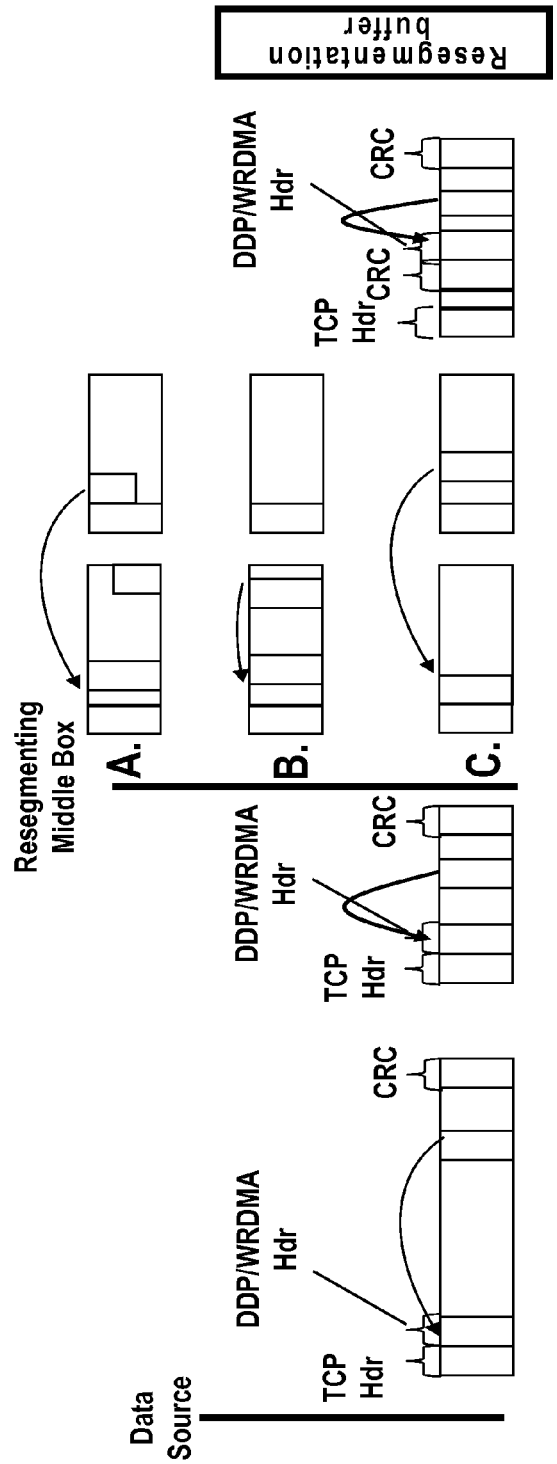
FIG. 13 shows an embodiment of a process that detects resegmented TCP segments according to the present invention.

The marker 80 may also be used to detect resegmentation of the TCP frames 50. FIG. 11 shows an example of the resegmentation of the TCP frame 50 into two TCP frames 50A, 50B according to the present invention. In this example, the framing header 70 may be in the first TCP frame 50A and the marker 80 may be in the second TCP frame 80. When the receiver 30 locates the marker 80, it may determine the location of the framing header 70. However, if the location of the framing header 70 is not in the TCP frame 50B, then the receiver 30 may determine that resegmentation has occurred. An intermediate box 40, for example, may have resegmented the TCP frames 50 from the transmitter 10. If the location of the framing header 70 is in the TCP frame 50B, but is not at the beginning of the TCP frame 50B (i.e., the framing header 70 was not right after the TCP header 60), then the receiver 30 may determine that resegmentation has occurred. In one embodiment, if resegmentation has occurred, then the receiver 30 may not offer the expedited accelerated services such as, for example, direct data placement. In another embodiment, the receiver 30 may use the marker 80 to reconstruct the TCP segments as transmitted initially by the sender 10 (i.e., to find the framing header and use the information embedded in it and in the DDP/RDMA to find the information placed by the ULP) and to perform all the services as for normal reception. As shown by FIG. 13, another method the receiver 30 may use to detect resegmentation is that marker 80, is not present in its entirety in the received TCP segment. As shown by FIG. 13, the length field of the framing header 70, may also be used by the receiver 30, to detect that the TCP segment contains one (or more) complete framing PDUs. The receiver 30 may identify a resegmentation by finding the framing header 70, not immediately following the TCP header 60, or in case the TCP segment contains more or less bytes than indicated by the length field of the framing header (see e.g., FIG. 7). If more bytes are found, the receiver 30 may treat the bytes immediately following the CRC as the framing header of the next framing PDU (i.e., more than one framing PDU has been packed into one TCP segment). If the last byte of the last framing PDU (e.g., its CRC field) is not the last byte of the TCP segment payload, then a resegmentation has occurred.

Figure 12A:
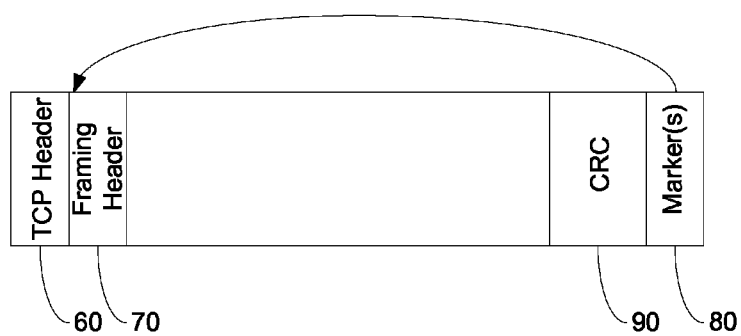
FIGS. 12A-D show embodiments of special marker locations according to the present invention.
Figure 12B:
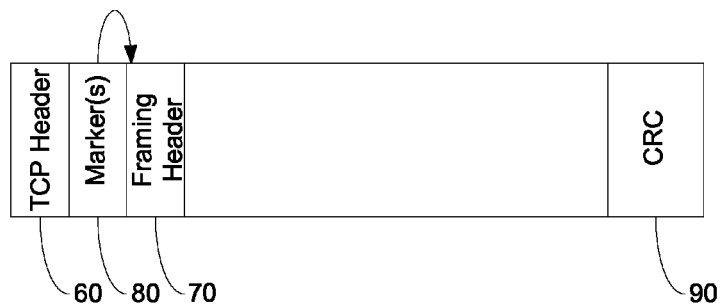
Figure 12C:
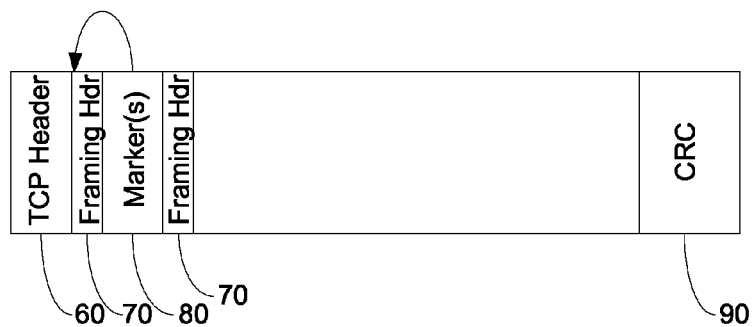
Figure 12D:
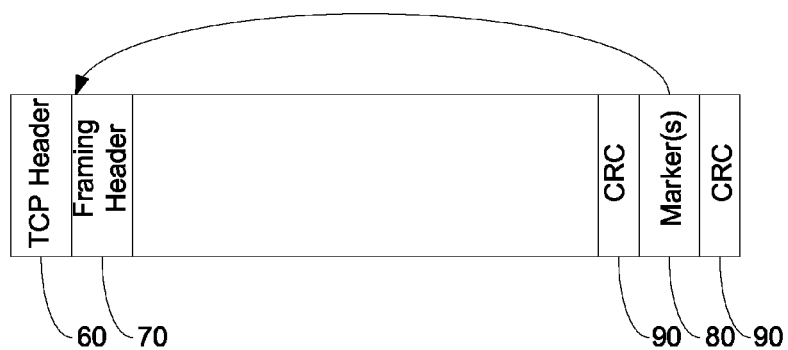

FIGS. 12A-D show embodiments of special marker locations according to the present invention. FIG. 12A shows an example of a TCP frame 50 in which the marker 80, if placed at its preset interval, would be located immediately after the CRC 90. In one embodiment, the marker 80 may be part of the current frame and may point backwards to the framing header 70 of the current frame. FIG. 12B shows another solution to the problem of the marker 80 being placed immediately after the CRC 90 as shown in FIG. 12A. In this example, the marker 80 may be moved to the front of the next TCP frame between the TCP header 60 and the framing header 70. The marker 80 may then point forwards to the framing header 70 (and have a value of 0). FIG. 12C shows an example in which the marker 80 is placed in the middle of the framing header 70. This case may pose no special problems since the marker may still effectively point to the beginning of the framing header 70. FIG. 12D shows an example in which the marker 80 is placed in the middle of the CRC 90. Since both the marker 80 and the CRC 90 may include, for example, four aligned bytes, this example may not be allowed.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
formatting a message including a transport protocol header;
attaching a framing header to the message, the framing header being placed immediately after the transport protocol header and before a message payload;
inserting a marker in the message payload pointing backwards to the framing header; and
sending the message including the attached framing header and the inserted marker from a first electronic device to a second electronic device via a network.

2. The method of claim 1, further comprising:
receiving the message at the second electronic device;
locating the marker;
using the marker to locate the framing header;
using the framing header to locate a separate protocol header; and
determining, at the second electronic device, whether the separate protocol header of the message identifies the message as a remote Direct Memory Access operation.

3. The method of claim 2, further comprising:
performing, at the second electronic device, a remote Direct Memory Access operation in accordance with data elements included in the message if the transport protocol header of the message identifies the message as the remote Direct Memory Access (rDMA) operation.

4. The method of claim 3, wherein the data elements in the message identify a set of buffers in the second electronic device which reference a memory of the second electronic device.

5. The method of claim 4, wherein data from the received message payload is written directly into the memory of the second electronic device without making an intermediate copy of the data.

6. The method of claim 3, wherein the data elements in the message indicate in which memory buffer and in which location within the memory buffer payload data should be directly placed.

7. The method of claim 1, wherein the framing header comprises at least one of control information or data information.

8. The method of claim 1, wherein the message comprises a TCP segment.

9. The method of claim 1, wherein the marker comprises a delta value indicating a number of bytes before a marker location to a particular location within the framing header.

10. The method of claim 1, further comprising:
processing a TCP segment such that message payload data is placed in a pre-designated memory location specific to the message payload data independent of other TCP segments.

11. The method of claim 10, wherein the message payload data is placed in the predesignated memory location specific to the message payload even if TCP segments arrive out of order.

12. An electronic device comprising:
a communication interface configured to receive a message from another electronic device; and
a processor configured to
locate a marker within the message;
use the marker to locate a framing header of the message;
use the framing header to locate a separate protocol header of the message;
determine whether the separate protocol header of the message identifies the message as a remote Direct Memory Access operation; and
cause the remote Direct Memory Access operation to be performed at the electronic device in accordance with data elements included in the message if the transport header of the message identifies the message as the remote Direct Memory Access (rDMA) operation.

13. The electronic device of claim 12, wherein the data elements in the message identify a set of buffers in the electronic device which reference a memory in the electronic device.

14. The electronic device of claim 13, wherein data from the received message payload is written directly into the memory of the electronic device without making an intermediate copy of the data.

15. The electronic device of claim 13, wherein the data elements in the message indicate in which memory buffer and in which location within the memory buffer payload data should be directly placed.

16. The electronic device of claim 12, wherein the framing header comprises at least one of control information or data information.

17. The electronic device of claim 12, wherein the message comprises a TCP segment.

18. The electronic device of claim 12, wherein the marker comprises a delta value indicating a number of bytes before a marker location to a particular location within the framing header.

19. The electronic device of claim 12, wherein the processor is configured to process a TCP segment such that message payload data is placed in a pre-designated memory location specific to the message payload data independent of other TCP segments.

20. A method comprising:
receiving, at a first electronic device, a message from a second electronic device;
locating a marker within the message;
using the marker to locate a framing header of the message;
using the framing header to locate a separate protocol header of the message;
determining whether the separate protocol header of the message identifies the message as a remote Direct Memory Access operation; and
causing the remote Direct Memory Access operation to be performed at the first electronic device in accordance with data elements included in the message if the transport header of the message identifies the message as the remote Direct Memory Access (rDMA) operation.

21. An electronic device comprising:
a processor configured to
- format a message including a transport protocol header;
- attach a framing header to the message, the framing header being placed immediately after the transport protocol header and before a message payload;
- insert a marker in the message payload pointing backwards to the framing header; and a communication interface configured to send the message including the attached framing header and the inserted marker from a first electronic device to a second electronic device via a network.

\* \* \* \* \*